United States Patent
Yoshimi

(10) Patent No.: US 9,158,939 B2
(45) Date of Patent: Oct. 13, 2015

(54) SECURITY CHIP, PROGRAM, INFORMATION PROCESSING APPARATUS, AND INFORMATION PROCESSING SYSTEM

(71) Applicant: Sony Corporation, Tokyo (JP)

(72) Inventor: Hideo Yoshimi, Kanagawa (JP)

(73) Assignee: Sony Corporation (JP)

( * ) Notice: Subject to any disclaimer, the term of this patent is extended or adjusted under 35 U.S.C. 154(b) by 89 days.

(21) Appl. No.: 13/970,692

(22) Filed: Aug. 20, 2013

(65) Prior Publication Data

US 2014/0068280 A1 Mar. 6, 2014

(30) Foreign Application Priority Data

Sep. 5, 2012 (JP) .................... 2012-195126

(51) Int. Cl.
- *H04L 9/32* (2006.01)
- *H04K 1/00* (2006.01)
- *G06F 21/72* (2013.01)
- *G09C 1/00* (2006.01)
- *H04L 9/08* (2006.01)
- *G06F 11/30* (2006.01)
- *G06F 11/14* (2006.01)

(52) U.S. Cl.
CPC ........ *G06F 21/72* (2013.01); *G09C 1/00* (2013.01); *H04L 9/0866* (2013.01); *H04L 9/3271* (2013.01); *H04L 2209/12* (2013.01)

(58) Field of Classification Search
CPC ............ G06F 21/86; G06F 2221/2103; G06F 2221/2153; G06F 2211/007; G06F 2211/008; H04L 9/3271; H04L 9/3273; H04L 12/40104
See application file for complete search history.

(56) References Cited

U.S. PATENT DOCUMENTS

| | | | | |
|---|---|---|---|---|
| 5,799,249 | A * | 8/1998 | Kennedy et al. | 455/411 |
| 8,296,565 | B2 * | 10/2012 | Taylor | 713/169 |
| 8,633,801 | B2 * | 1/2014 | Iwai | 340/5.8 |
| 2003/0221103 | A1 * | 11/2003 | Hirota et al. | 713/172 |
| 2005/0108309 | A1 * | 5/2005 | Tsuboka et al. | 708/250 |
| 2006/0059549 | A1 * | 3/2006 | Suzuki et al. | 726/9 |
| 2006/0101288 | A1 * | 5/2006 | Smeets et al. | 713/194 |
| 2006/0204004 | A1 * | 9/2006 | Shankar et al. | 380/44 |
| 2007/0214296 | A1 * | 9/2007 | Takamatsu et al. | 710/63 |
| 2007/0276760 | A1 * | 11/2007 | Kanehara et al. | 705/59 |
| 2010/0275036 | A1 * | 10/2010 | Harada et al. | 713/189 |
| 2013/0142329 | A1 * | 6/2013 | Bell et al. | 380/44 |

FOREIGN PATENT DOCUMENTS

JP 2008-085547 A 4/2008

* cited by examiner

*Primary Examiner* — Dede Zecher
*Assistant Examiner* — Trang Doan
(74) *Attorney, Agent, or Firm* — Lerner, David, Littenberg, Krumholz & Mentlik, LLP

(57) ABSTRACT

There is provided a security chip having a tamper-resistant feature, including an acquisition part configured to acquire specific information transmitted by a device performing challenge-response authentication, the specific information being specific to the device, a storage configured to store second key information that enables generation of first key information from the specific information, the first key information being used by the device for challenge-response authentication, and a generation part configured to generate, using the second key information, the first key information from the specific information. A response to be transmitted to the device is generated, using the first key information, from a challenge transmitted by the device. In the device, the first key information is not stored in a tamper-resistant security chip.

15 Claims, 21 Drawing Sheets

FIG. 5
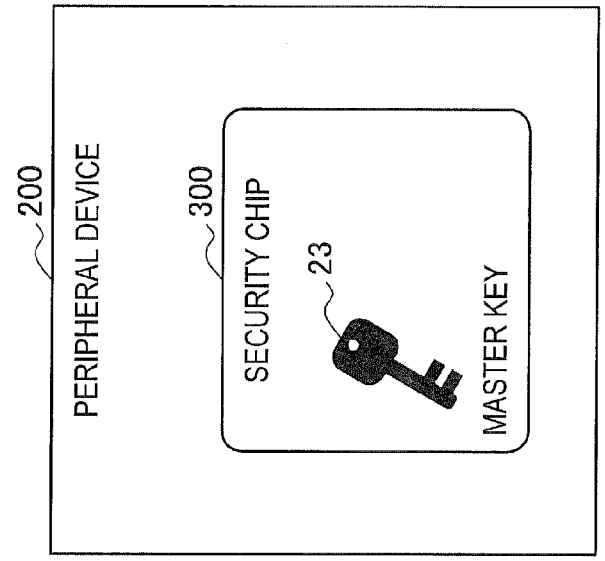
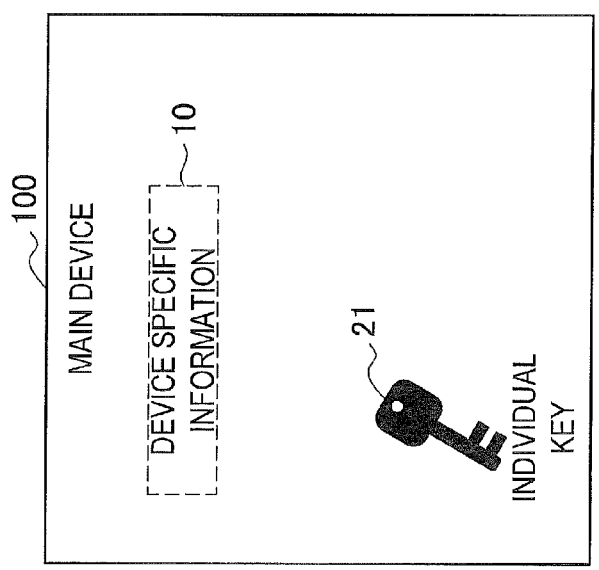

SECURITY CHIP, PROGRAM, INFORMATION PROCESSING APPARATUS, AND INFORMATION PROCESSING SYSTEM

BACKGROUND

The present disclosure relates to a security chip, a program, an information processing apparatus, and an information processing system.

In recent years, fake peripheral devices (for example, battery packs) have been distributed in the market. Accordingly, those fake peripheral devices cause various issues. For example, the following accident occurs: a fake battery pack that does not have overcharging protection circuit is connected to a main device such as a digital camera or a personal computer (PC), and thus the fake battery pack explodes.

In order to solve such issue, it is necessary that a main device authenticate a peripheral device (for example, battery pack) that is connected to the main device. That is, it is necessary that the main device determine whether the peripheral device connected to the main device is a genuine product (or authorized product) or a fake product. Then, in the case of determining that the fake battery pack is connected to the main device, for example, the main device performs control such that charging of the fake battery pack is not started. In this way, overheating and explosion of the fake battery pack can be prevented. Accordingly, a technology is suggested for performing challenge-response authentication between a main device and a peripheral device each having a tamper-resistant chip (that is, security chip).

For example, JP 2008-85547A discloses a technology for performing authentication between devices in the following manner: a main device transmits random number data to an accessory device; the accessory device transmits a result obtained by performing arithmetic processing on the random number data to the main device; and the main device compares the decrypted data of the result with the random number data.

SUMMARY

However, according to conventional technology including the technology disclosed in JP 2008-85547A, in the case where common key cryptography is employed for authentication of a peripheral device (accessory device), it is necessary that both a main device and the peripheral device each be provided with a tamper-resistant chip in order to prevent leakage of a common key. That is, in order to perform more secure device authentication using the common key cryptography, it costs a lot for the chips.

On the other hand, in the case where public key cryptography is employed for authentication of a peripheral device, since leakage of a private key is to be prevented, only the peripheral device may be provided with a security chip. That is, in the case where the public key cryptography is employed, the cost for the chip becomes lower than the case where the common key cryptography is employed. However, the public key cryptography uses an asymmetric key which accompanies many mathematically difficult processes. Therefore, in the case where the public key cryptography is employed, compared with the case where the common key cryptography is employed, the processing speed becomes slower and it becomes necessary that the capacity of memory become larger. That is, in order to perform more secure device authentication using the public key cryptography, the processing speed becomes slow and the cost for the memory becomes high.

In light of the foregoing, it is desirable to provide a novel and improved mechanism that enables high-speed secure device authentication at a low cost.

According to an embodiment of the present disclosure, there is provided a security chip having a tamper-resistant feature, which includes an acquisition part configured to acquire specific information transmitted by a device performing challenge-response authentication, the specific information being specific to the device, a storage configured to store second key information that enables generation of first key information from the specific information, the first key information being used by the device for challenge-response authentication, and a generation part configured to generate, using the second key information, the first key information from the specific information. A response to be transmitted to the device is generated, using the first key information, from a challenge transmitted by the device. In the device, the first key information is not stored in a tamper-resistant security chip.

Further, according to another embodiment of the present disclosure, there is provided a program for causing a security chip having a tamper-resistant feature to function as an acquisition part configured to acquire specific information transmitted by a device performing challenge-response authentication, the specific information being specific to the device, and a generation part configured to generate first key information from the specific information using second key information stored in the security chip, the second key information enabling generation of the first key information from the specific information, the first key information being used by the device for challenge-response authentication. A response to be transmitted to the device is generated, using the first key information, from a challenge transmitted by the device. In the device, the first key information is not stored in a tamper-resistant security chip.

Further, according to another embodiment of the present disclosure, there is provided an information processing apparatus which includes a communication interface configured to receive a challenge transmitted by a device performing challenge-response authentication and specific information transmitted by the device, the specific information being specific to the device, and to transmit a response corresponding to the challenge to the device, and a security chip having a tamper-resistant feature. The security chip includes an acquisition part configured to acquire the specific information, a storage configured to store second key information that enables generation of first key information from the specific information, the first key information being used by the device for challenge-response authentication, and a generation part configured to generate, using the second key information, the first key information from the specific information. A response to be transmitted to the device is generated from the challenge by using the first key information. In the device, the first key information is not stored in a tamper-resistant security chip.

Further, according to another embodiment of the present disclosure, there is provided an information processing apparatus which includes a communication interface configured to transmit a challenge and specific information specific to the information processing apparatus, the challenge and the specific information being used for challenge-response authentication, to a device including a security chip having a tamper-resistant feature, and to receive a response corresponding to the challenge from the device, and a processing circuit configured to perform challenge-response authentication by using first key information stored in the information processing apparatus, the challenge, and the response. The security chip stores second key information that enables generation of the first key information from the specific information. The first key information is generated by the security chip using the second key information from the specific information. In the device, the response is generated from the challenge by using the first key information. In the information processing apparatus, the first key information is not stored in a tamper-resistant security chip.

Further, according to another embodiment of the present disclosure, there is provided an information processing system including a first information processing apparatus and a second information processing apparatus. The first information processing apparatus includes a communication interface configured to transmit a challenge and specific information specific to the first information processing apparatus, the challenge and the specific information being used for challenge-response authentication, to the second information processing apparatus, and to receive a response corresponding to the challenge from the second information processing apparatus, and a processing circuit configured to perform challenge-response authentication by using first key information stored in the first information processing apparatus, the challenge, and the response. The second information processing apparatus includes a communication interface configured to receive the challenge and the specific information, the challenge and the specific information being transmitted by the first information processing apparatus, and to transmit the response to the first information processing apparatus, and a security chip having a tamper-resistant feature. The security chip includes an acquisition part configured to acquire the specific information, a storage configured to store second key information that enables generation of the first key information from the specific information, and a generation part configured to generate, using the second key information, the first key information from the specific information. In the second information processing apparatus, the response is generated from the challenge by using the first key information. In the first information processing apparatus, the first key information is not stored in a tamper-resistant security chip.

According to the embodiments of the present disclosure described above, high-speed secure device authentication can be performed at a low cost.

BRIEF DESCRIPTION OF THE DRAWINGS

FIG. 5 is an explanatory diagram showing an example of a schematic configuration of an information processing system according to an embodiment of the present disclosure;

DETAILED DESCRIPTION OF THE EMBODIMENT(S)

Figure 1:
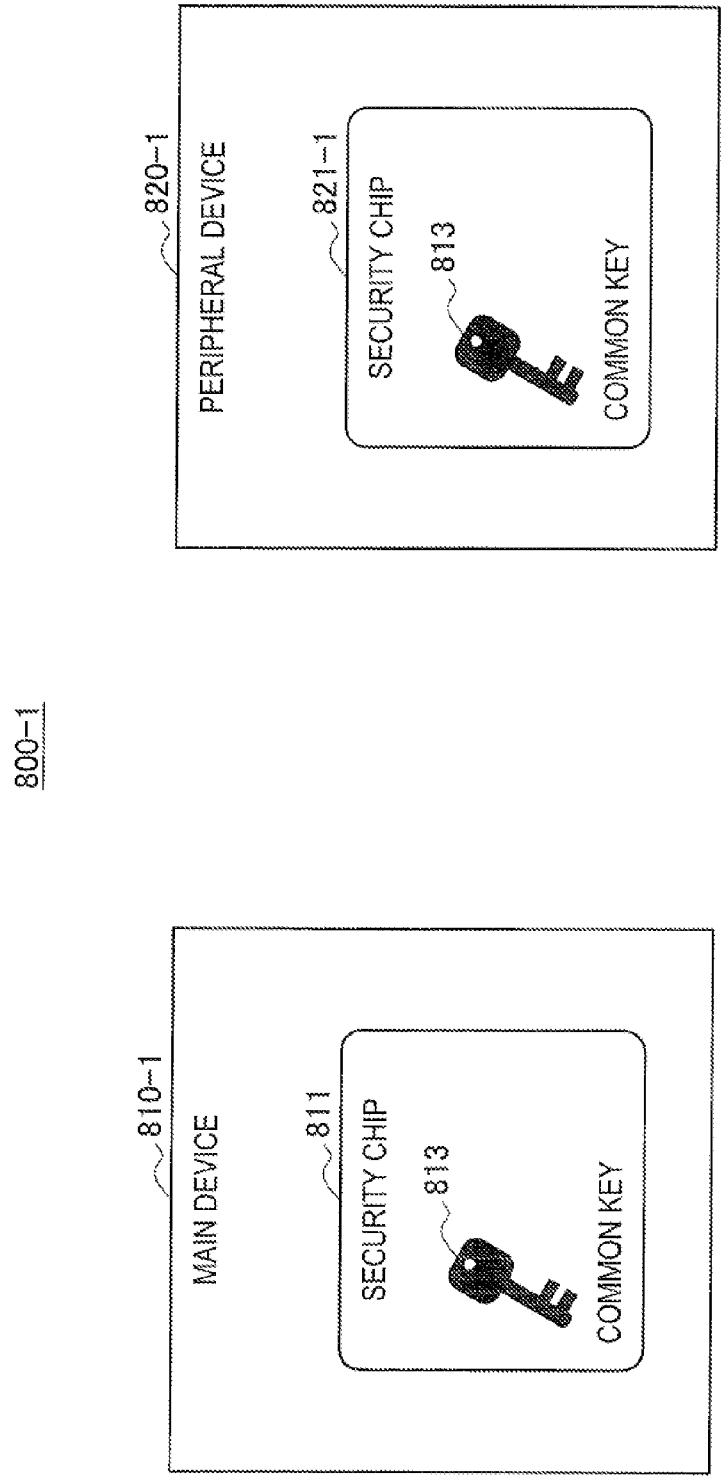
FIG. 1 is an explanatory diagram showing an example of a schematic configuration of an information processing system that performs challenge-response authentication of the past employing common key cryptography.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

Note that the description will be given in the following order.

1. Introduction
2. Schematic configuration of information processing system
3. Configuration of each device
   3.1. Configuration of main device
   3.2. Configuration of peripheral device
   3.3. Configuration of security chip 3.3.1. Hardware configuration
3.3.2. Functional configuration
4. Flow of processing
5. Modified example
   5.1. First modified example
   5.2. Second modified example
   5.3. Third modified example
6. Conclusion

1. INTRODUCTION

First, with reference to FIGS. 1 to 4, there will be described a background, challenge-response authentication of the past employing common key cryptography, challenge-response authentication of the past employing public key cryptography, and technical issues.

(Background)

In recent years, fake peripheral devices (for example, battery packs) have been distributed in the market. Accordingly, those fake peripheral devices cause various issues. For example, the following accident occurs: a fake battery pack that does not have overcharging protection circuit is connected to a main device such as a digital camera or a PC, and thus the fake battery pack explodes.

In order to solve such issue, it is necessary that a main device authenticate a peripheral device (for example, battery pack) that is connected to the main device. That is, it is necessary that the main device determine whether the peripheral device connected to the main device is a genuine product or a fake product. Then, in the case of determining that the fake battery pack is connected to the main device, for example, the main device performs control such that charging of the fake battery pack is not started. In this way, overheating and explosion of the fake battery pack can be prevented. As such authentication, challenge-response authentication may be performed, for example.

(Challenge-Response Authentication of the Past Employing Common Key Cryptography)

In challenge-response authentication for authenticating a peripheral device connected to a main device, common key cryptography may be employed. Hereinafter, description will be made more specifically on this matter with reference to FIG. 1 and FIG. 2.

FIG. 1 is an explanatory diagram showing an example of a schematic configuration of an information processing system 800-1 that performs challenge-response authentication of the past employing common key cryptography. Referring to FIG. 1, there is shown the information processing system 800-1 including a main device 810-1 and a peripheral device 820-1. In the information processing system 800-1, the main device 810-1 performs challenge-response authentication to authenticate the peripheral device 820-1. The challenge-response authentication employs common key cryptography. Accordingly, the main device 810-1 and the peripheral device 820-1 each store a common key 813. In addition, in order to prevent leakage of the common key, that is, in order to perform secure authentication, the main device 810-1 stores the common key 813 in a tamper-resistant security chip 811 and the peripheral device 820-1 stores the common key 813 in a tamper-resistant security chip 821-1. In this way, two security chips are used in the information processing system 800-1.

Figure 2:
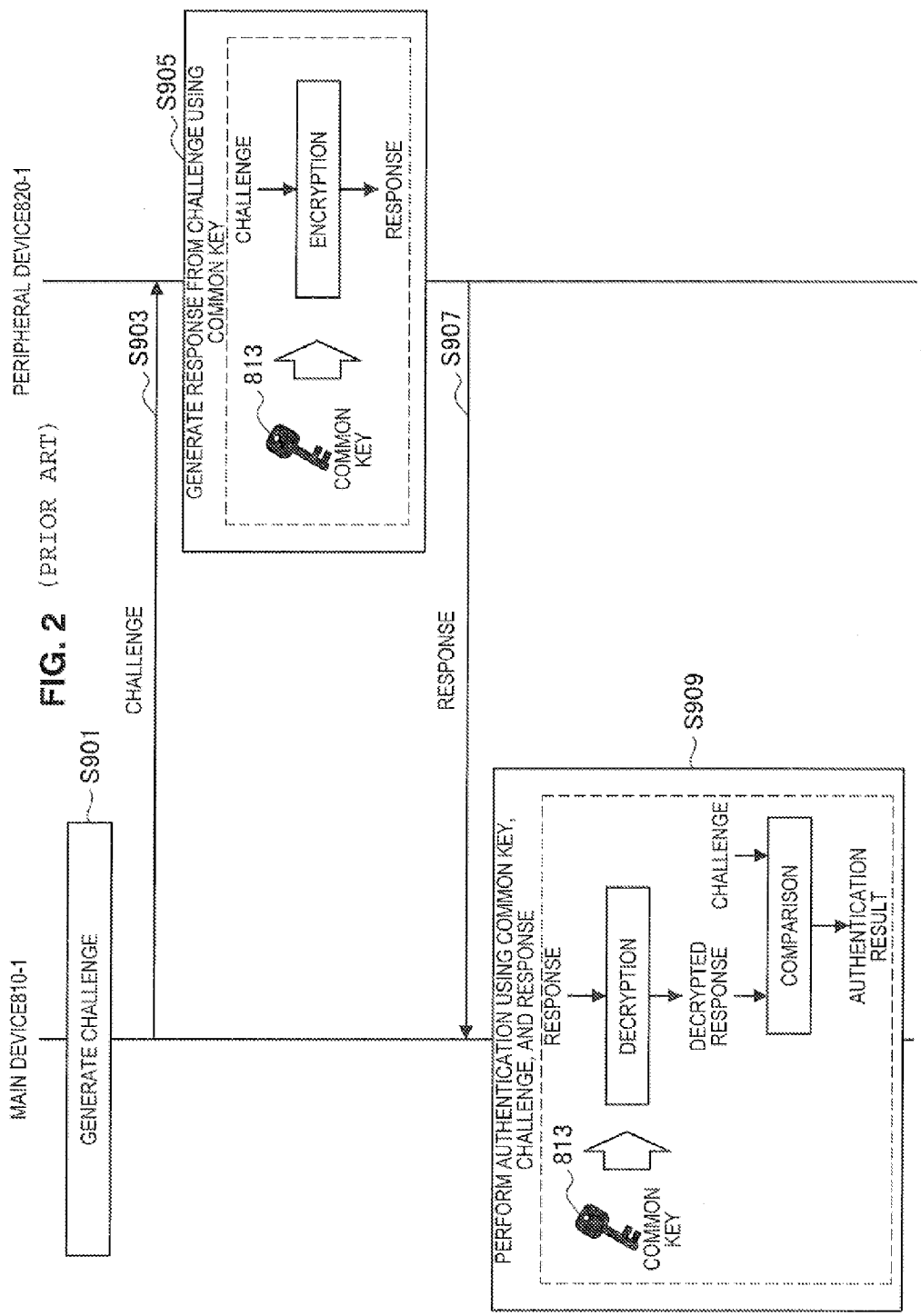
FIG. 2 is a sequence diagram showing an example of a schematic flow of challenge-response authentication processing of the past employing common key cryptography.

FIG. 2 is a sequence diagram showing an example of a schematic flow of challenge-response authentication processing of the past employing common key cryptography. First, the main device 810-1 generates a challenge (random data such as random numbers and a random character string) for the challenge-response authentication (Step S901). Then, the main device 810-1 transmits the generated challenge to the peripheral device 820-1, and the peripheral device 820-1 receives the challenge (Step S903). After that, the security chip 821-1 of the peripheral device 820-1 generates, using the common key 813, a response from the received challenge (Step S905). Typically, the security chip 821-1 generates the response by encrypting the challenge using an advanced encryption standard (AES) cryptographic algorithm. Then, the peripheral device 820-1 transmits the generated response to the main device 810-1, and the main device 810-1 receives the response (Step S907). After that, the main device 810-1 authenticates the peripheral device 820-1 using the common key 813, the challenge, and the response (Step S909). For example, the main device 810-1 decrypts the response using the common key 813, and compares the decrypted response with the challenge. If the decrypted response and the challenge correspond to each other, the main device 810-1 determines that the peripheral device 820-1 is a genuine product. If the decrypted response and the challenge do not correspond to each other, the main device 810-1 determines that the peripheral device 820-1 is a fake product. In this way, an authentication result can be obtained showing whether the peripheral device 820-1 is a genuine product or a fake product.

(Challenge-Response Authentication of the Past Employing Public Key Cryptography)

On the other hand, in challenge-response authentication for authenticating a peripheral device connected to a main device, public key cryptography may also be employed. Hereinafter, description will be made more specifically on this matter with reference to FIG. 3 and FIG. 4.

Figure 3:
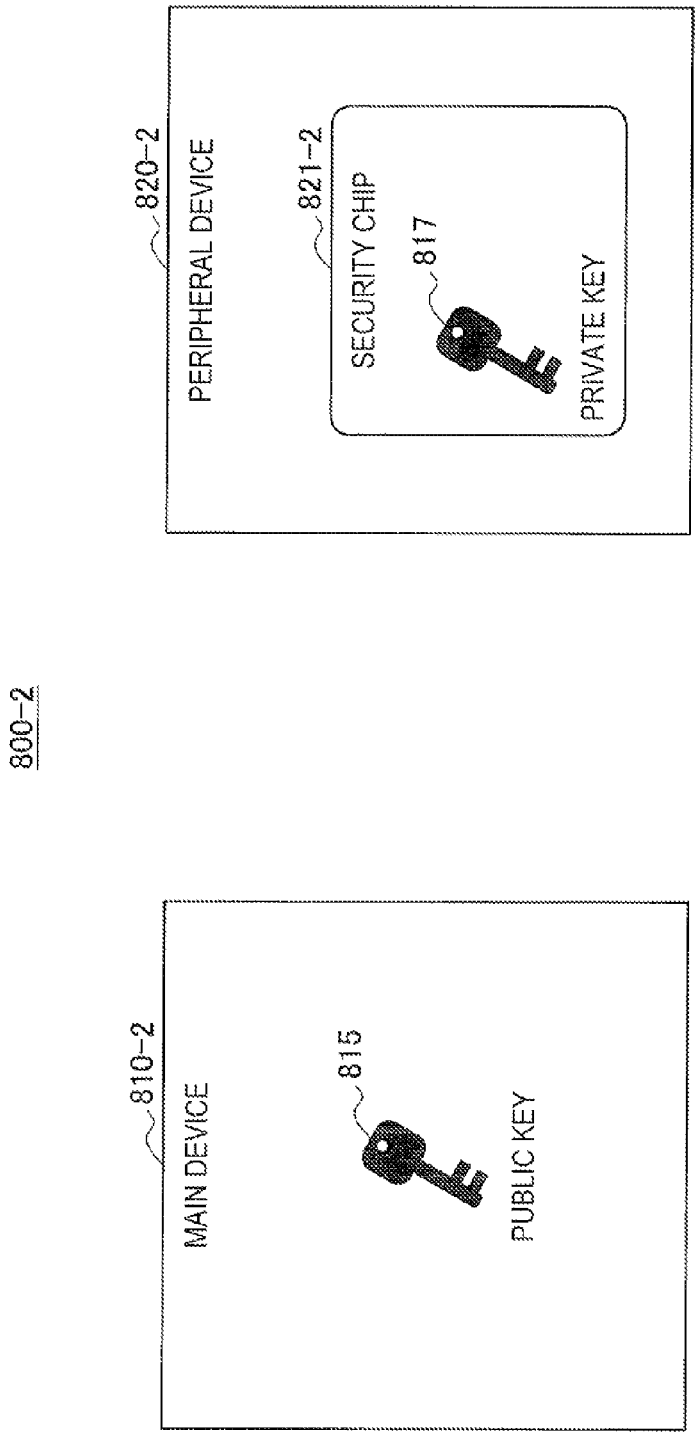
FIG. 3 is an explanatory diagram showing an example of a schematic configuration of an information processing system that performs challenge-response authentication of the past employing public key cryptography.

FIG. 3 is an explanatory diagram showing an example of a schematic configuration of an information processing system 800-2 that performs challenge-response authentication of the past employing public key cryptography. Referring to FIG. 3, there is shown the information processing system 800-2 including a main device 810-2 and a peripheral device 820-2. In the information processing system 800-2, the main device 810-2 performs challenge-response authentication to authenticate the peripheral device 820-2. The challenge-response authentication employs public key cryptography. Accordingly, the main device 810-2 stores a public key 815. Further, the peripheral device 820-2 stores a private key 817. In addition, in order to prevent leakage of the private key, that is, in order to perform secure authentication, the peripheral device 820-2 stores the private key 817 in a tamper-resistant security chip 821-2. In this way, one security chip is used in the information processing system 800-2.

Figure 4:
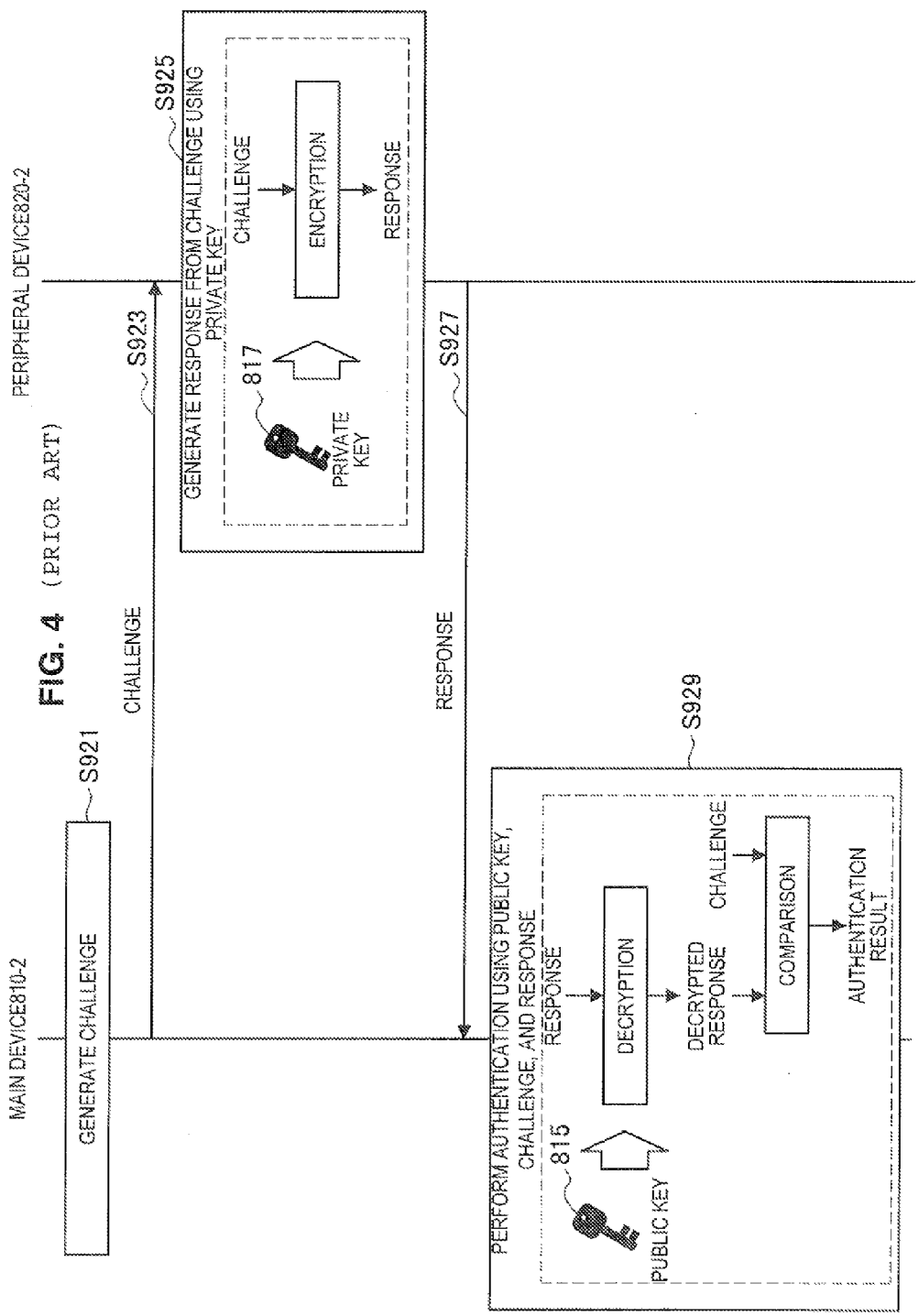
FIG. 4 is a sequence diagram showing an example of a schematic flow of challenge-response authentication processing employing public key cryptography.

FIG. 4 is a sequence diagram showing an example of a schematic flow of challenge-response authentication processing employing public key cryptography. First, the main device 810-2 generates a challenge for the challenge-response authentication (Step S921). Then, the main device 810-2 transmits the generated challenge to the peripheral device 820-2, and the peripheral device 820-2 receives the challenge (Step S923). After that, the security chip 821-2 of the peripheral device 820-2 generates, using the private key 817, a response from the received challenge (Step S925). Typically, the security chip 821-2 generates the response by encrypting the challenge using a Rivest-Shamir-Adleman (RAS) cryptographic algorithm. Then, the peripheral device 820-2 transmits the generated response to the main device 810-2, and the main device 810-2 receives the response (Step S927). After that, the main device 810-2 authenticates the peripheral device 820-2 using the public key 815, the challenge, and the response (Step S929). For example, the main device 810-2 decrypts the response using the public key 815, and compares the decrypted response with the challenge. If the decrypted response and the challenge correspond to each other, the main device 810-2 determines that the peripheral device 820-2 is a genuine product. If the decrypted response and the challenge do not correspond to each other, the main device 810-2 determines that the peripheral device 820-2 is a fake product. In this way, an authentication result can be obtained showing whether the peripheral device 820-2 is a genuine product or a fake product.

(Technical Issues)

However, for each type of challenge-response authentication described above, there are some concerns about cost or processing speed.

First, according to the challenge-response authentication of the past employing common key cryptography, the cost of a chip is high in the information processing system 800-1. More specifically, in the case where the common key cryptography is employed for authentication of the peripheral device 820-1, it is necessary that both the main device 810-1 and the peripheral device 820-1 each be provided with a tamper-resistant chip in order to prevent leakage of a common key. That is, in order to perform more secure device authentication using the common key cryptography, it costs a lot for the chips.

Further, according to the challenge-response authentication of the past employing public key cryptography, although the cost for the chip is low in the information processing system 800-2, the processing speed is slow and the cost for the memory is high. More specifically, in the case where the public key cryptography is employed for authentication of the peripheral device 820-2, since leakage of the private key 817 is to be prevented, only the peripheral device 820-2 may be provided with a security chip. That is, in the case where the public key cryptography is employed, the cost for the chip becomes lower than the case where the common key cryptography is employed. However, the public key cryptography uses an asymmetric key which accompanies many mathematically difficult processes. Therefore, in the case where the public key cryptography is employed, compared with the case where the common key cryptography is employed, the processing speed becomes slower and it becomes necessary that the capacity of memory become larger. That is, in order to perform more secure device authentication using the public key cryptography, the processing speed becomes slow and the cost for the memory becomes high.

Accordingly, in the present embodiment, it becomes possible to perform high-speed secure device authentication at a low cost. That is, it becomes possible to perform high-speed secure challenge-response authentication to authenticate a peripheral device while reducing the cost of the information processing system including the main device and the peripheral device. Hereinafter, the following items will be described specifically: <<<2. Schematic configuration of information processing system>>>, <<<3. Configuration of each device>>>, <<<4. Flow of processing>>>, and <<<5. Modified example>>>.

2. SCHEMATIC CONFIGURATION OF INFORMATION PROCESSING SYSTEM

Figure 6:
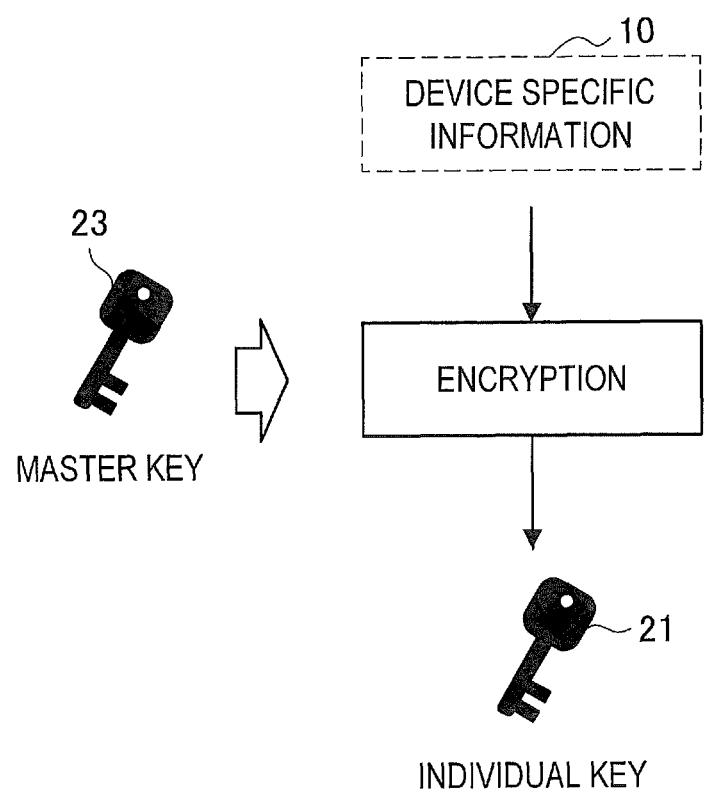
FIG. 6 is an explanatory diagram illustrating a relationship between device specific information, an individual key, and a master key.

With reference to FIG. 5 and FIG. 6, there will be described a schematic configuration of an information processing system 1 according to an embodiment of the present disclosure. FIG. 5 is an explanatory diagram showing an example of a schematic configuration of an information processing system 1 according to the present embodiment. Referring to FIG. 5, the information processing system 1 includes a main device 100 and a peripheral device 200.

(Main Device 100)

The main device 100 stores information 10 (hereinafter, referred to as "device specific information 10") that is specific to the main device 100. Further, the main device 100 also stores first key information 21 (hereinafter, referred to as "individual key 21") used for challenge-response authentication. The device specific information 10 and the individual key 21 are stored in the main device 100 in advance (for example, before shipment from a manufacturing facility). Note that the individual key is not stored in a tamper-resistant security chip in the main device 100.

Further, for example, the device specific information 10 is information that is randomly generated for the main device 100. For example, the randomly generated information may be random numbers, a random character string, and the like. In this case, the device specific information is generated by the main device 100 or is generated by another device (for example, PC in a manufacturing facility), and is provided to the main device 100. By using the randomly generated information as the device specific information 10 in this way, information specific to the main device 100 can be obtained even in the case where it is difficult to acquire identification information of the main device 100.

Note that the device specific information 10 may also be identification information for uniquely identifying the main device 100 or a component of the main device 100. For example, the identification information may be a serial number of the main device 100, a serial number of a central processing unit (CPU) provided to the main device 100, or the like. By using the identification information as the device specific information 10 in this way, information specific to the main device 100 can be obtained without generating new information.

Further, the main device 100 may be a personal computer (PC), as an example. Note that the main device 100 may be another device such as a digital camera, a projector, cellular phone terminal (including smartphone), a personal digital assistant (PDA), an electronic book terminal, a game device, or a music player.

(Peripheral Device 200)

The peripheral device 200 includes a tamper-resistant security chip 300. Further, the security chip 300 stores second key information 23 (hereinafter, referred to as "master key 23") that enables generation of the individual key 21 from the device specific information 10. The master key 23 is stored in the security chip 300 in advance (for example, before shipment of the security chip 300 or the peripheral device 200 from a manufacturing facility). Hereinafter, a relationship between the device specific information 10, the individual key 21, and the master key 23 will be described specifically with reference to FIG. 6.

FIG. 6 is an explanatory diagram illustrating a relationship between the device specific information 10, the individual key 21, and the master key 23. Referring to FIG. 6, the individual key 21 is generated from the device specific information 10 using the master key 23. More specifically, for example, the individual key 21 is generated by using the master key 23 as a cryptographic key and encrypting the device specific information 10. As an example, in the encryption, an AES cryptographic algorithm is used. The individual key 21 generated in this way becomes individual key information for each main device.

Note that the individual key 21 may be generated by a method other than the encryption using the AES cryptographic algorithm. For example, the individual key 21 may be generated by using a cryptographic algorithm (for example, Camellia cryptographic algorithm) other than the AES cryptographic algorithm, using the master key 23 as a cryptographic key, and encrypting the device specific information 10. Further, the individual key 21 may also be generated as a message authentication code (MAC). That is, the individual key 21 may be the MAC that is generated by using the device specific information 10 as a message and the master key 23 as a key, and using a MAC algorithm. The MAC algorithm may also be a cipher-based message authentication code (CMAC) or a keyed-hashing for message authentication code (HMAC), for example. In addition, the individual key 21 may be generated as a hash value. That is, the individual key 21 may also be the hash value of the device specific information 10, which is calculated by using the master key 23 as a key and using a keyed hash function.

Further, for example, the master key 23 is key information shared with another security chip that operates in the same manner as the security chip 300. More specifically, for example, the master key 23 is key information shared with a security chip of a genuine product (or authorized product) that operates in the same manner as the security chip 300. By sharing the key information between security chips as the master key 23 in this way, the main device 100 can continuously use the individual key 21 (that is stored before shipment from a manufacturing facility, for example) even if the peripheral device 200 is exchanged for another one. In addition, even when the peripheral device 200 is connected to or built into another main device 100, the other main device 100 can authenticate the peripheral device 200. How the authentication is performed will be described specifically later.

Further, the peripheral device 200 may be a battery pack, as an example. Note that in the case where the main device 100 is a game device, the peripheral device 200 may be a controller of the game device, a memory card storing software, or the like. Further, in the case where the main device 100 is a digital camera or a projector, the peripheral device 200 may be a lens attached to the digital camera or the projector. In this way, the peripheral device 200 may be any of the various peripheral devices that may be connected to or attached to the main device 100.

In the present embodiment, the main device 100 performs challenge-response authentication to authenticate the peripheral device 200. Then, as described above, in the present embodiment, it becomes possible to perform high-speed secure challenge-response authentication to authenticate the peripheral device 200 while reducing the cost of the information processing system 1 including the main device 100 and the peripheral device 200. Hereinafter, the following items will be described more specifically: <<<3. Configuration of each device>>>; <<<4. Flow of processing>>>; and <<<5. Modified example>>>.

3. CONFIGURATION OF EACH DEVICE

Next, with reference to FIGS. 7 to 13, there will be described examples of configurations of the main device 100, the peripheral device 200, and the security chip 300 included in the peripheral device 200, each according to the present embodiment.

<<3.1. Configuration of Main Device>>

Figure 7:
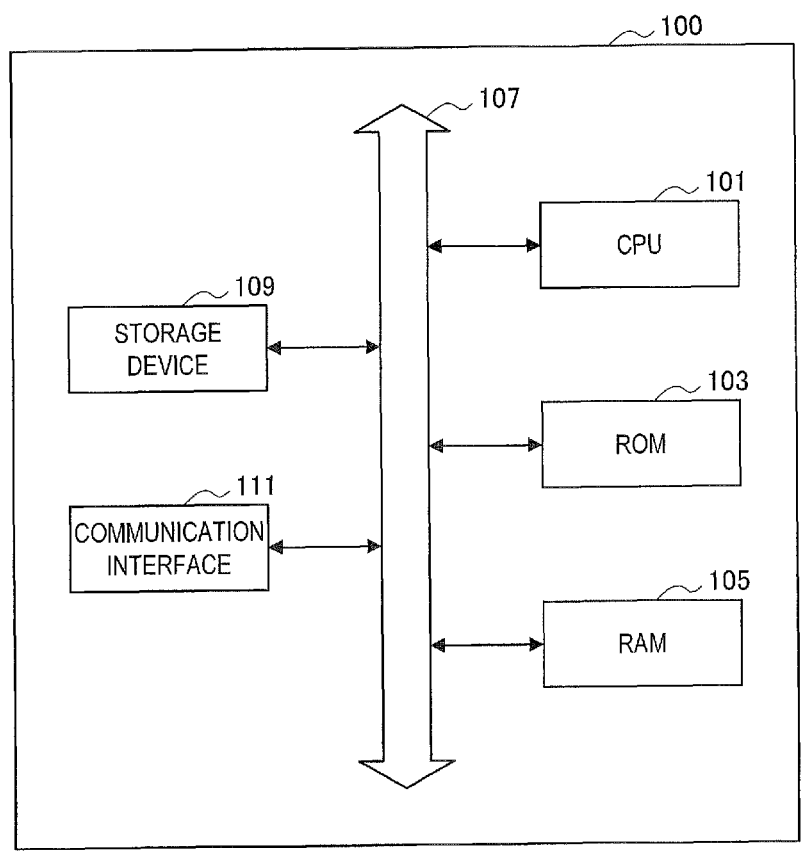
FIG. 7 is a block diagram showing an example of a hardware configuration of a main device according to an embodiment.
Figure 8:
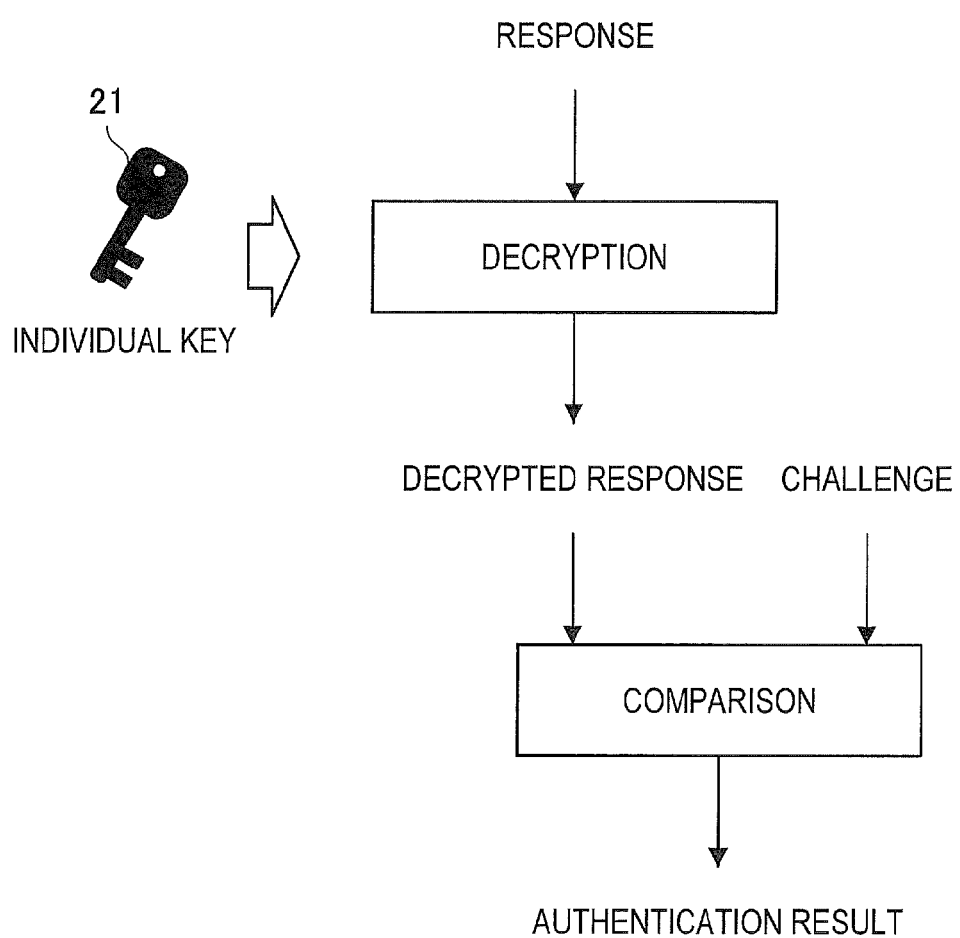
FIG. 8 is an explanatory diagram illustrating a first example of comparison processing using a challenge and a response.
Figure 9:
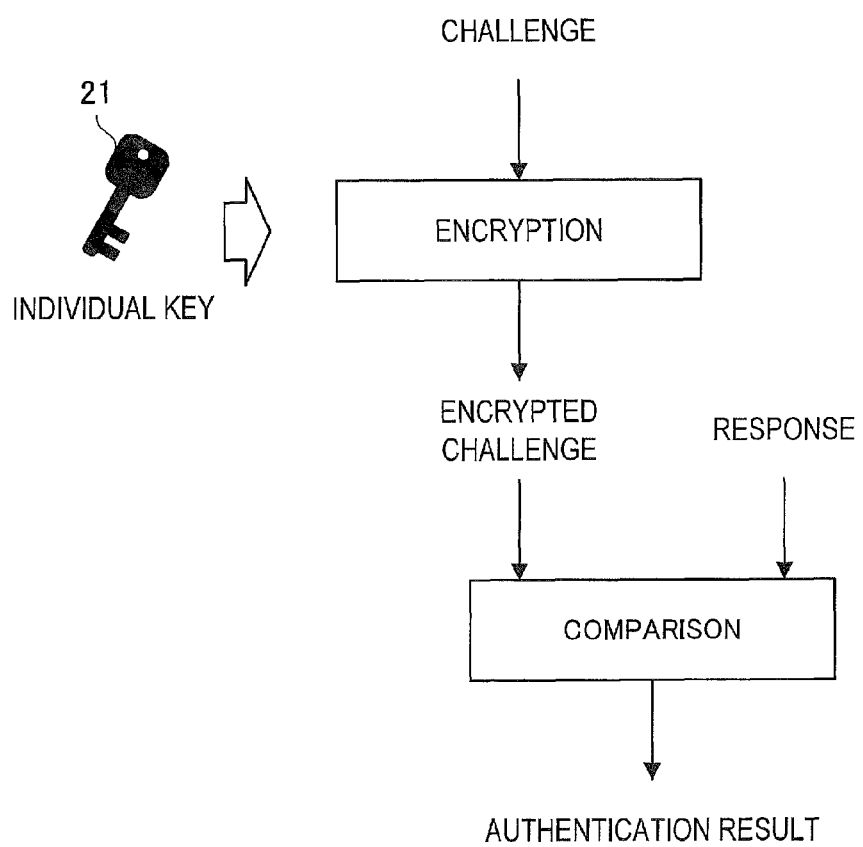
FIG. 9 is an explanatory diagram illustrating a second example of comparison processing using a challenge and a response.

With reference to FIGS. 7 to 9, an example of a configuration of the main device 100 will be described. FIG. 7 is a block diagram showing an example of a hardware configuration of the main device 100 according to the present embodiment. Referring to FIG. 7, the main device 100 includes a central processing unit (CPU) 101, read only memory (ROM) 103, random access memory (RAM) 105, a bus 107, a storage device 109, and a communication interface 111.

(CPU 101)

The CPU 101 executes various processes executed in the main device 100. In other words, the CPU 101 is an example of a processing circuit provided to the main device 100.

In particular, the CPU 101 performs challenge-response authentication using an individual key 21 stored in the main device 100, a challenge for the challenge-response authentication, and a response corresponding to the challenge. The challenge-response authentication is performed for authenticating the peripheral device 200. Note that the challenge-response authentication may be performed in accordance with a protocol defined in ISO/IEC 9798-2 and/or ISO/IEC 9798-4, for example.

For example, the CPU 101 generates a challenge for the challenge-response authentication, and causes the communication interface 111 to transmit the challenge to the peripheral device 200. Further, the CPU 101 also causes the communication interface 111 to transmit device specific information 10 to the peripheral device 200. Then, when the communication interface 111 receives a response transmitted by the peripheral device 200, the CPU 101 authenticates the peripheral device 200 using the individual key 21, the challenge, and the response. That is, the CPU 101 performs comparison processing using the individual key 21, the challenge, and the response. As a result of the comparison processing, an authentication result can be obtained showing whether the peripheral device 200 is a genuine product (or authorized product) or a fake product.

As the comparison processing, there are various methods. As a first example, the challenge-response authentication includes comparing a challenge with a challenge generated from a response generated by the peripheral device 200 (security chip 300) using the individual key 21. Hereinafter, specific contents of the comparison processing will be described with reference to FIG. 8.

FIG. 8 is an explanatory diagram illustrating a first example of comparison processing using a challenge and a response. As a condition for the first example, a response is generated by encrypting a challenge using the individual key 21 in the peripheral device 200. Referring to FIG. 8, first, the CPU 101 decrypts the response using the individual key 21. Next, the CPU 101 compares the decrypted response with a challenge. When the decrypted response and the challenge correspond to each other, the CPU 101 determines that the peripheral device 200 is a genuine product (or authorized product). When the decrypted response and the challenge do not correspond to each other, the CPU 101 determines that the peripheral device 200 is a fake product.

Further, as a second example, the challenge-response authentication includes comparing a response generated by the peripheral device 200 (security chip 300) with a response generated from a challenge by the main device 100 using the individual key 21. Hereinafter, specific contents of the comparison processing will be described with reference to FIG. 9.

FIG. 9 is an explanatory diagram illustrating a second example of comparison processing using a challenge and a response. As a condition for the second example, a response is generated by encrypting a challenge using the individual key 21 in the peripheral device 200. Referring to FIG. 9, first, the CPU 101 encrypts the challenge using the individual key 21. Next, the CPU 101 compares the encrypted challenge with a received response. When the encrypted challenge and the response correspond to each other, the CPU 101 determines that the peripheral device 200 is a genuine product (or authorized product). When the encrypted challenge and the response do not correspond to each other, the CPU 101 determines that the peripheral device 200 is a fake product.

Note that, in the examples shown in FIG. 8 and FIG. 9 as described above, an AES cryptographic algorithm is used as an example of the encryption. In the encryption, another cryptographic algorithm (for example, Camellia cryptographic algorithm) may also be used.

Further, in the example shown in FIG. 9, instead of encrypting the challenge using the individual key 21, the CPU 101 may also use the challenge as a message and the individual key 21 as a key to generate a MAC using a MAC algorithm (such as CMAC and HMAC). As a condition for this case, the peripheral device 200 also uses the challenge as a message and the individual key 21 as a key to generate a MAC using a MAC algorithm (such as CMAC and HMAC), and transmits the MAC as the response to the main device 100.

Further, instead of encrypting the challenge using the individual key 21, the CPU 101 may also use the individual key 21 as a key to calculate a hash value of the challenge using a keyed hash function. As a condition for this case, the peripheral device 200 also uses the individual key 21 as a key to calculate a hash value of the challenge using a keyed hash function, and transmits the hash value as the response to the main device 100.

As the second example of the comparison processing, the processing can be accelerated not by performing the comparison between challenges but by performing the comparison between responses. First, the main device 100 can generate a response from a challenge from the time of transmitting the challenge to the peripheral device 200 until the time of receiving the response from the peripheral device 200. Accordingly, the main device 100 can perform the comparison immediately after the reception of the response. As a result, the time required for the processing is shortened. Second, since the time required for the processing of encrypting the challenge is shorter than the time required for the processing of decrypting the response, the time required for the processing is shortened. In this way, the processing may be accelerated.

(ROM 103)

The ROM 103 stores a program for causing the CPU 101 to execute processing in the main device 100 and data.

(RAM 105)

The RAM 105 temporarily stores a program and data when executing processing of the CPU 101.

(Bus 107)

The bus 107 mutually connects the CPU 101, the ROM 103, and the RAM 105. In addition, to the bus 107, the storage device 109 and the communication interface 111 are connected.

(Storage Device 109)

The storage device 109 stores data that is to be stored temporarily or permanently in the main device 100. For example, the storage device 109 may be a magnetic recording medium such as a hard disk, or may be non-volatile memory such as electrically erasable and programmable read only memory (EEPROM), flash memory, magnetoresistive random access memory (MRAM), ferroelectric random access memory (FeRAM), or phase change random access memory (PRAM).

(Communication Interface 111)

The communication interface 111 is communication means for the main device 100 to communicate via wire or radio with an external device (in particular, peripheral device 200). The communication interface 111 includes, for example, a communication port for communication through wire, or a communication antenna and a radio frequency (RF) circuit for radio communication.

In particular, the communication interface 111 transmits a challenge and device specific information 10 for challenge-response authentication to the peripheral device 200. Further, the communication interface 111 receives a response corresponding to the challenge from the peripheral device 200.

Heretofore, an example of the configuration of the main device 100 has been described. As shown in this example, the main device 100 does not have a tamper-resistant security chip, for example. That is, in the main device 100, the individual key 21 is not stored in the tamper-resistant security chip. Note that the main device 100 may include a tamper-resistant security chip for a use other than the challenge-response authentication.

<<3.2. Configuration of Peripheral Device>>

Figure 10:
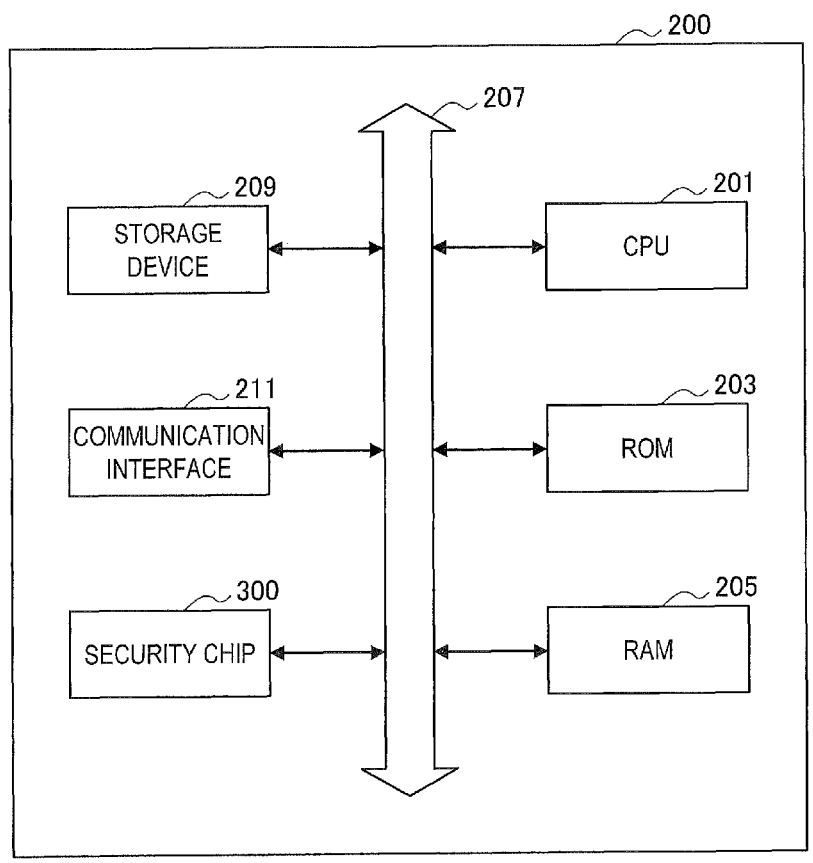
FIG. 10 is a block diagram showing an example of a hardware configuration of a peripheral device according to an embodiment.

Next, with reference to FIG. 10, an example of a configuration of the peripheral device 200 will be described. FIG. 10 is a block diagram showing an example of a hardware configuration of the peripheral device 200 according to the present embodiment. Referring to FIG. 10, the peripheral device 200 includes a CPU 201, ROM 203, RAM 205, a bus 207, a storage device 209, a communication interface 211, and a security chip 300.

(CPU 201)

The CPU 201 executes various processes executed in the peripheral device 200.

(ROM 203)

The ROM 203 stores a program for causing the CPU 201 to execute processing in the peripheral device 200 and data.

(RAM 205)

The RAM 205 temporarily stores a program and data when executing processing of the CPU 201.

(Bus 207)

The bus 207 mutually connects the CPU 201, the ROM 203, and the RAM 205. In addition, to the bus 207, the storage device 209, the communication interface 211, and the security chip 300 are additionally connected.

(Storage Device 209)

The storage device 209 stores data that is to be stored temporarily or permanently in the peripheral device 200. For example, the storage device 209 may be a magnetic recording medium such as a hard disk, or may be non-volatile memory such as EEPROM, flash memory, MRAM, FeRAM, or PRAM.

(Communication Interface 211)

The communication interface 211 is communication means for the peripheral device 200 to communicate via wire or radio with an external device (in particular, main device 100). The communication interface 211 includes, for example, a communication port for communication through wire, or a communication antenna and an RF circuit for radio communication.

In particular, the communication interface 211 receives a challenge and device specific information 10 transmitted by the main device 100. Further, the communication interface 211 transmits a response corresponding to the challenge to the main device 100.

(Security Chip 300)

The security chip 300 is a tamper-resistant chip. Next, a detail of the security chip 300 will be described.

<<3.3. Configuration of Security Chip>>

Figure 11:
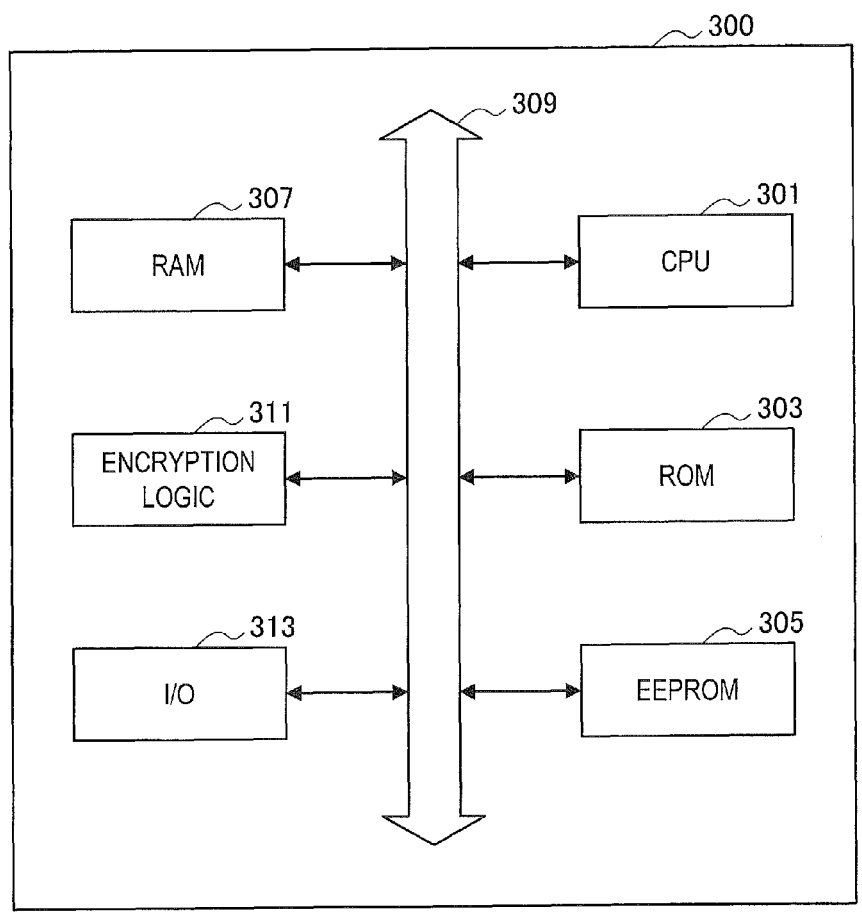
FIG. 11 is a block diagram showing an example of a hardware configuration of a security chip according to an embodiment.
Figure 12:
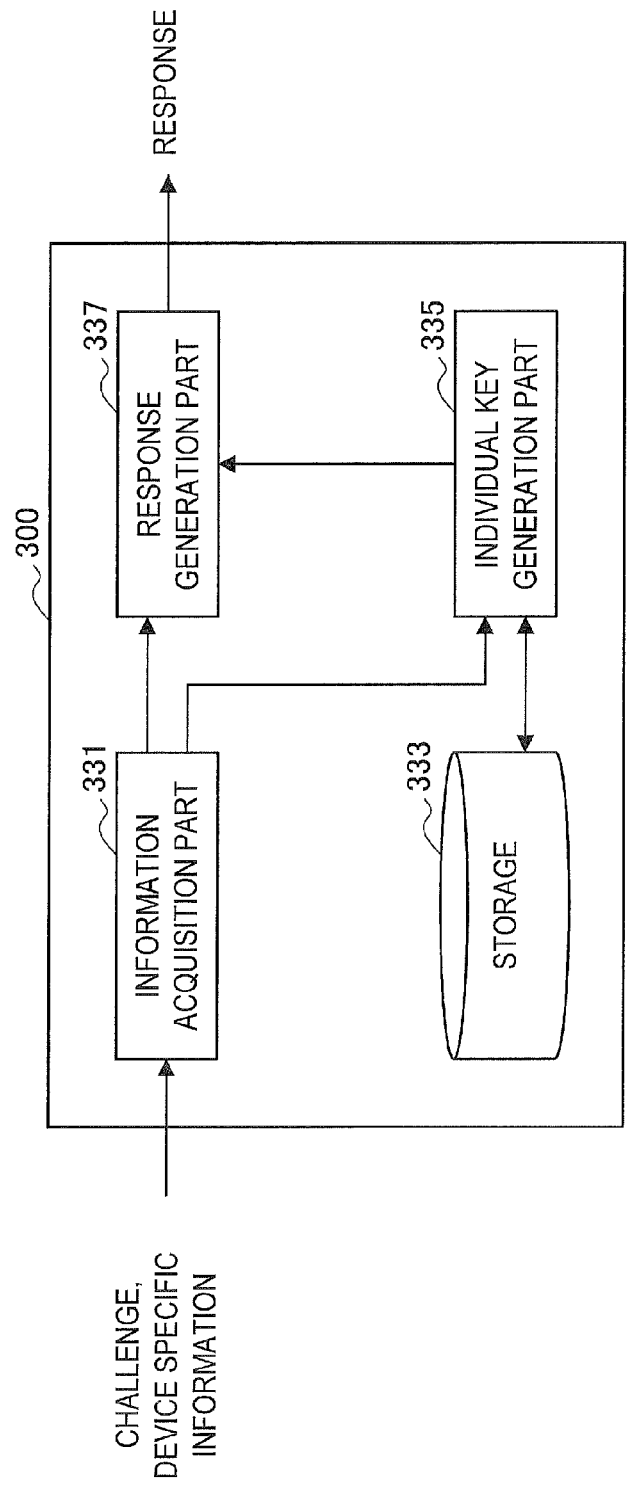
FIG. 12 is a block diagram showing an example of a functional configuration of a security chip according to an embodiment.
Figure 13:
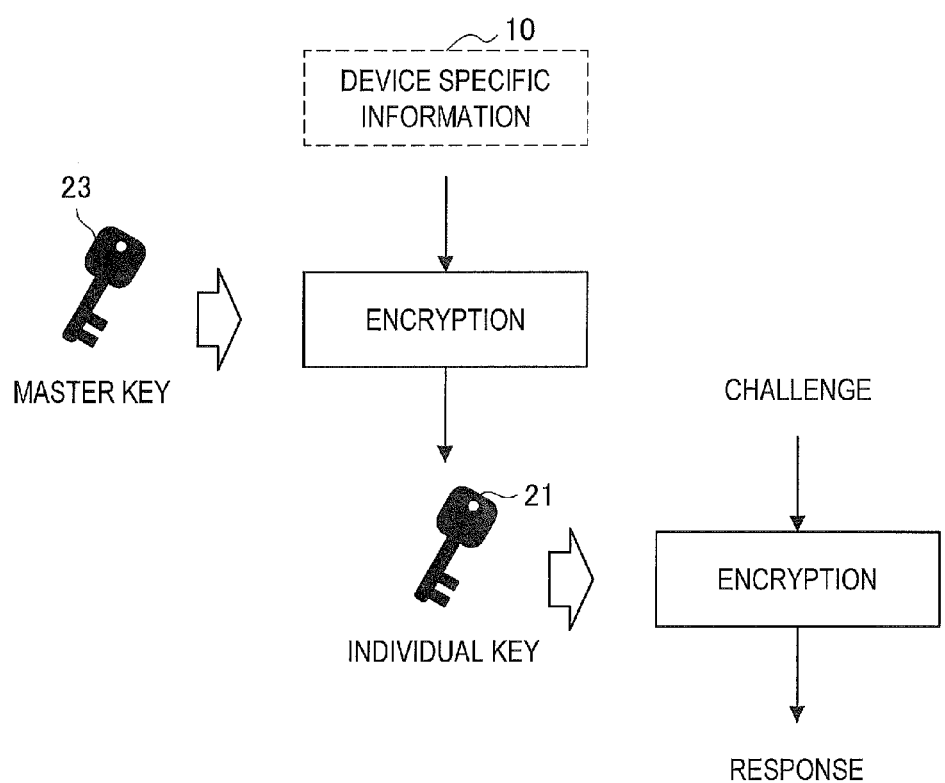
FIG. 13 is an explanatory diagram illustrating an example of processing of generating a response using an individual key.

With reference to FIGS. 11 to 13, an example of a configuration of the security chip 300 will be described. Here, first, an example of a hardware configuration of the security chip 300 will be briefly described, and then an example of a functional configuration of the security chip 300 that may be implemented with the hardware configuration and software will be described in detail.

<3.3.1. Hardware Configuration>

First, with reference to FIG. 11, an example of a hardware configuration of the security chip 300 will be described. FIG. 11 is a block diagram showing an example of a hardware configuration of the security chip 300 according to the present embodiment. Referring to FIG. 11, the security chip 300 includes a CPU 301, ROM 303, EEPROM 305, RAM 307, a bus 309, an encryption logic 311, and an input/output interface 313 (hereinafter, referred to as "I/O 313").

The CPU 301 executes various processes executed in the security chip 300. The ROM 303 stores a program for causing the CPU 301 to execute processing in the security chip 300 and data. The EEPROM 305 stores information (for example, master key 23) that is to be stored in the security chip 300 without extracting the information from the security chip 300. Further, the RAM 307 temporarily stores a program and data when executing processing of the CPU 301.

The encryption logic 311 executes encryption processing using any cryptographic algorithm. The encryption logic 311 may be a versatile processor, or may be a dedicated wired logic. Note that, in the case where the cryptographic algorithm is not used and a MAC algorithm, a hash function, or the like is used, the security chip 300 may include, instead of the encryption logic 311, a logic for the MAC algorithm, a hash function, or the like.

The I/O 313 connects the security chip 300 to the peripheral device 200 (bus 207). The I/O 313 acquires input information that is input to the security chip 300, and outputs output information that is output from the security chip 300 to the peripheral device 200.

<3.3.2. Functional Configuration>

With reference to FIG. 12 and FIG. 13, an example of a functional configuration of the security chip 300 according to the present embodiment will be described. FIG. 12 is a block diagram showing an example of a functional configuration of the security chip 300 according to the present embodiment. Referring to FIG. 12, the security chip 300 includes an information acquisition part 331, a storage 333, an individual key generation part 335, and a response generation part 337.

(Information Acquisition Part 331)

The information acquisition part 331 acquires device specific information 10 transmitted by the main device 100. More specifically, for example, when device specific information 10 transmitted by the main device 100 is received by the peripheral device 200, the information acquisition part 331 acquires the received device specific information 10.

Further, for example, the information acquisition part 331 also acquires a challenge transmitted by the main device 100. More specifically, when a challenge transmitted by the main device 100 is received by the peripheral device 200, the information acquisition part 331 acquires the received challenge.

(Storage 333)

The storage 333 stores the master key 23 that enables generation of the individual key 21 from the device specific information 10, the individual key 21 being used by the main device 100 for challenge-response authentication. As described above, the master key 23 is stored in the storage 333 in advance (for example, before shipment of the security chip 300 or the peripheral device 200 from a manufacturing facility).

Further, as described above, the master key 23 is key information shared with another security chip that operates in the same manner as the security chip 300. More specifically, for example, the master key 23 is key information shared with a security chip of a genuine product (or authorized product) that operates in the same manner as the security chip 300.

(Individual Key Generation Part 335)

The individual key generation part 335 generates the individual key 21 from the device specific information 10 using the master key 23. The individual key 21 is generated in the same manner as the individual key 21 stored in the main device 100 in advance (for example, before shipment from a manufacturing facility). More specifically, for example, as described with reference to FIG. 6, the individual key generation part 335 generates the individual key 21 by encrypting the device specific information 10 using the master key 23 as a cryptographic key. As an example, in the encryption, an AES cryptographic algorithm is used.

Note that the individual key generation part 335 may generate the individual key 21 by a method other than the encryption using the AES cryptographic algorithm.

For example, the individual key generation part 335 may generate the individual key 21 by using a cryptographic algorithm (for example, Camellia cryptographic algorithm) other than the AES cryptographic algorithm, and encrypting the device specific information 10 using the master key 23 as a cryptographic key.

Further, instead of encrypting the device specific information 10 using the master key 23, the individual key generation part 335 may generate a message authentication code (MAC) as the individual key 21. That is, the individual key generation part 335 may generate a MAC using the device specific information 10 as a message and the master key 23 as a key and using a MAC algorithm, and may output the MAC as the individual key 21. The MAC algorithm may be a CMAC or an HMAC, for example.

Further, instead of encrypting the device specific information 10 using the master key 23, the individual key generation part 335 may calculate a hash value of the device specific information 10 by using the master key 23 as a key and using a keyed hash function, and may output the hash value as the individual key 21.

(Response Generation Part 337)

The response generation part 337 uses the individual key 21 and generates a response to be transmitted to the main device 100 from a challenge transmitted by the main device 100. Hereinafter, a specific example of processing of generating a response using the individual key 21 will be described with reference to FIG. 13.

FIG. 13 is an explanatory diagram illustrating an example of processing of generating a response using the individual key 21. Referring to FIG. 13, first, as described above, the individual key generation part 335 generates the individual key 21 by encrypting the device specific information 10 using the master key 23 as a cryptographic key, for example. Then, for example, the response generation part 337 generates the response by encrypting a challenge using the generated individual key 21 as a cryptographic key. As an example, in the encryption, an AES cryptographic algorithm is used.

Note that the response generation part 337 may generate the response by a method other than the encryption using the AES cryptographic algorithm.

For example, the response generation part 337 may generate the response by using a cryptographic algorithm (for example, Camellia cryptographic algorithm) other than the AES cryptographic algorithm, and encrypting the challenge using the individual key 21 as a cryptographic key.

Further, instead of encrypting a challenge using the individual key 21, the response generation part 337 may generate a MAC using the challenge as a message and the individual key 21 as a key, and using a MAC algorithm (such as CMAC or HMAC). Then, the response generation part 337 may output the MAC as the response.

Further, instead of encrypting the challenge using the individual key 21, the response generation part 337 may calculate a hash value of the challenge by using the individual key 21 as a key and using a keyed hash function. Then, the response generation part 337 may output the hash value as the response.

Heretofore, an example of the functional configuration of the security chip 300 according to the present embodiment has been described. Note that the information acquisition part 331 may be implemented with the I/O 313, for example. Further, the storage 333 may be implemented with the EEPROM 305. Further, the individual key generation part 335 and the response generation part 337 may be implemented with the encryption logic 311, for example.

4. FLOW OF PROCESSING

Next, with reference to FIGS. 14 to 17, an example of information processing according to the present embodiment will be described.

(Challenge-Response Authentication Processing)

Figure 14:
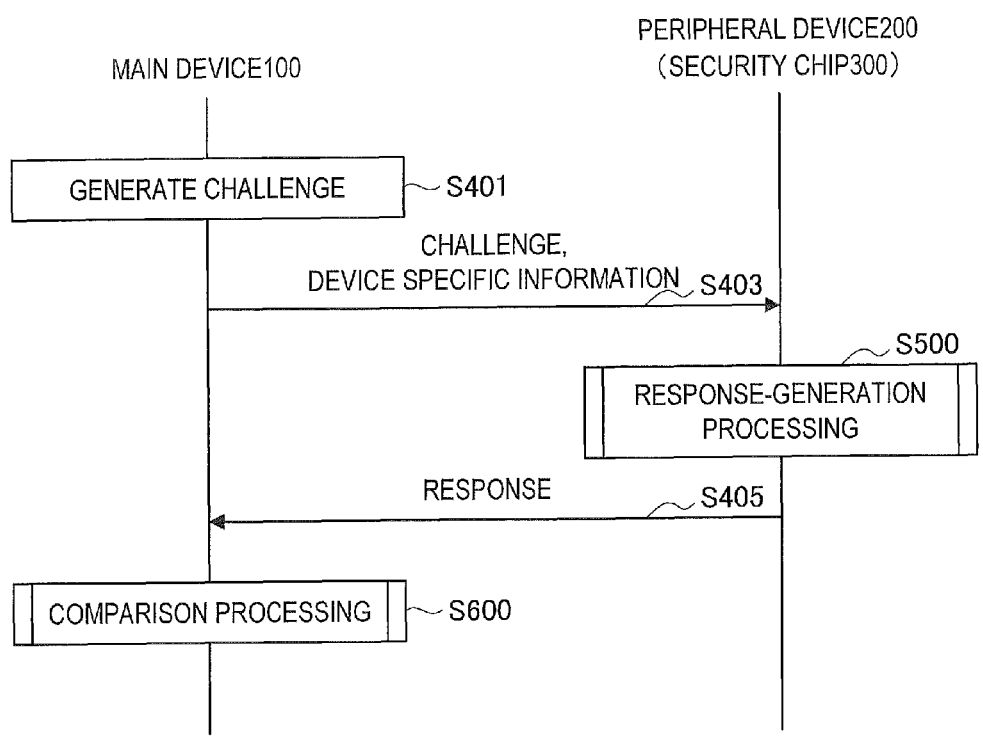
FIG. 14 is a sequence diagram showing an example of a schematic flow of challenge-response authentication processing according to an embodiment.

First, with reference to FIG. 14, an example of challenge-response authentication processing according to the present embodiment will be described. FIG. 14 is a sequence diagram showing an example of a schematic flow of challenge-response authentication processing according to the present embodiment.

In Step S401, the CPU 101 of the main device 100 generates a challenge for challenge-response authentication.

In Step S403, the communication interface 111 of the main device 100 transmits the challenge and device specific information 10 for the challenge-response authentication to the peripheral device 200. Then, the communication interface 211 of the peripheral device 200 receives the challenge and the device specific information 10 transmitted by the main device 100.

In Step S500, the security chip 300 included in the peripheral device 200 executes response-generation processing. That is, the security chip 300 generates a response corresponding to the challenge.

In Step S405, the communication interface 211 of the peripheral device 200 transmits the generated response to the main device 100. Then, the communication interface 111 of the main device 100 receives the response transmitted by the peripheral device 200.

In Step S600, the CPU 101 of the main device 100 executes comparison processing using the challenge and the response. As a result, an authentication result is obtained showing whether the peripheral device 200 is a genuine product (or authorized product) or a fake product.

(S500-1: Response-Generation Processing)

Figure 15:
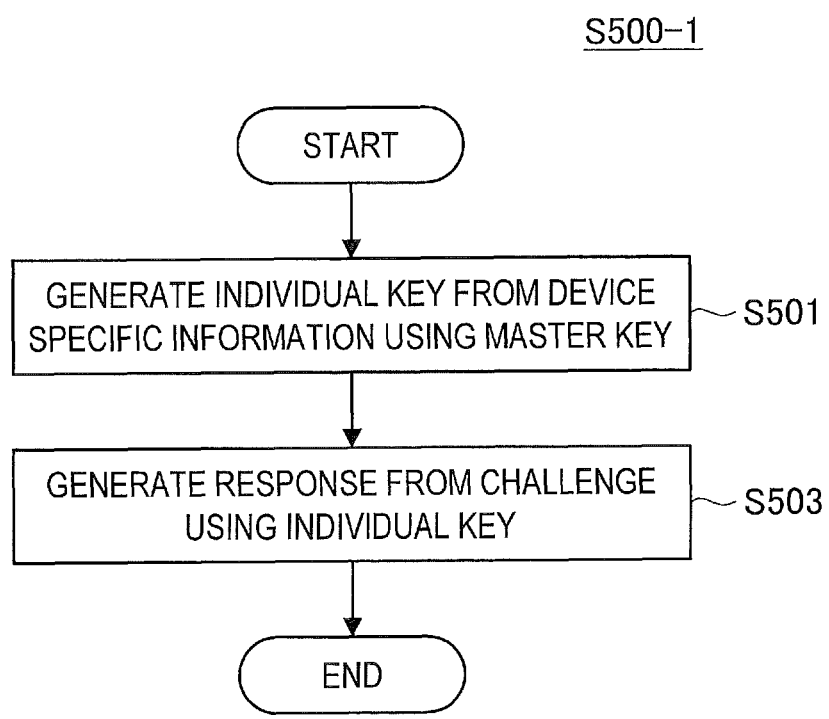
FIG. 15 is a flowchart showing an example of a schematic flow of response-generation processing according to an embodiment.

Next, with reference to FIG. 15, an example of response-generation processing according to the present embodiment will be described. FIG. 15 is a flowchart showing an example of a schematic flow of response-generation processing according to the present embodiment. The response-generation processing corresponds to the processing described with reference to FIG. 13.

In Step S501, the individual key generation part 335 of the security chip 300 generates the individual key 21 from the device specific information 10 using the master key 23.

In Step S503, the response generation part 337 uses the individual key 21 and generates a response to be transmitted to the main device 100 from a challenge transmitted by the main device 100. Then, the processing ends.

(S600-1: Comparison Processing)

Figure 16:
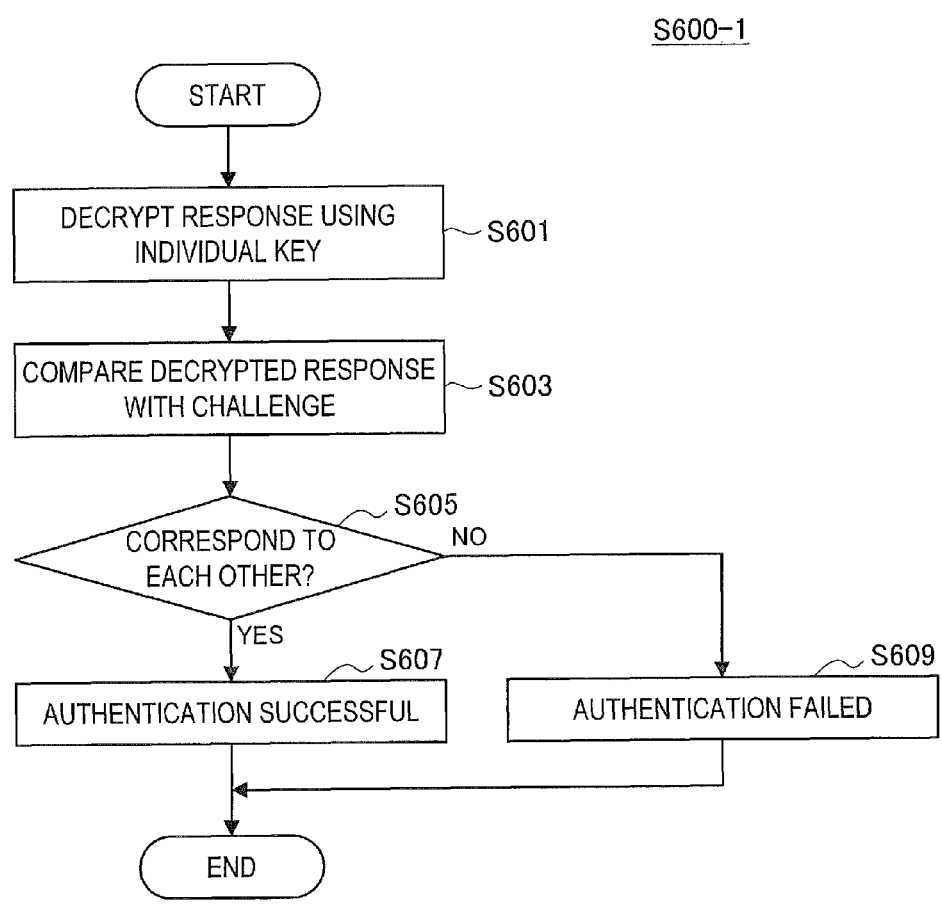
FIG. 16 is a flowchart showing a first example of a schematic flow of comparison processing according to an embodiment.

Next, with reference to FIG. 16, a first example of comparison processing according to the present embodiment will be described. FIG. 16 is a flowchart showing a first example of a schematic flow of comparison processing according to the present embodiment. The comparison processing corresponds to the comparison processing described with reference to FIG. 8.

In Step S601, the CPU 101 of the main device 100 decrypts a response using the individual key 21.

In Step S603, the CPU 101 of the main device 100 compares the decrypted response with a challenge.

In Step S605, if the decrypted response and the challenge correspond to each other, the processing proceeds to Step S607. If not, the processing proceeds to Step S609.

In Step S607, the CPU 101 of the main device 100 determines that the peripheral device 200 is a genuine product (or authorized product). That is, the authentication of the peripheral device 200 is succeeded. Then, the processing ends.

In Step S609, the CPU 101 of the main device 100 determines that the peripheral device 200 is a fake product. That is, the authentication of the peripheral device 200 is failed. Then, the processing ends.

(S600-2: Comparison Processing)

Figure 17:
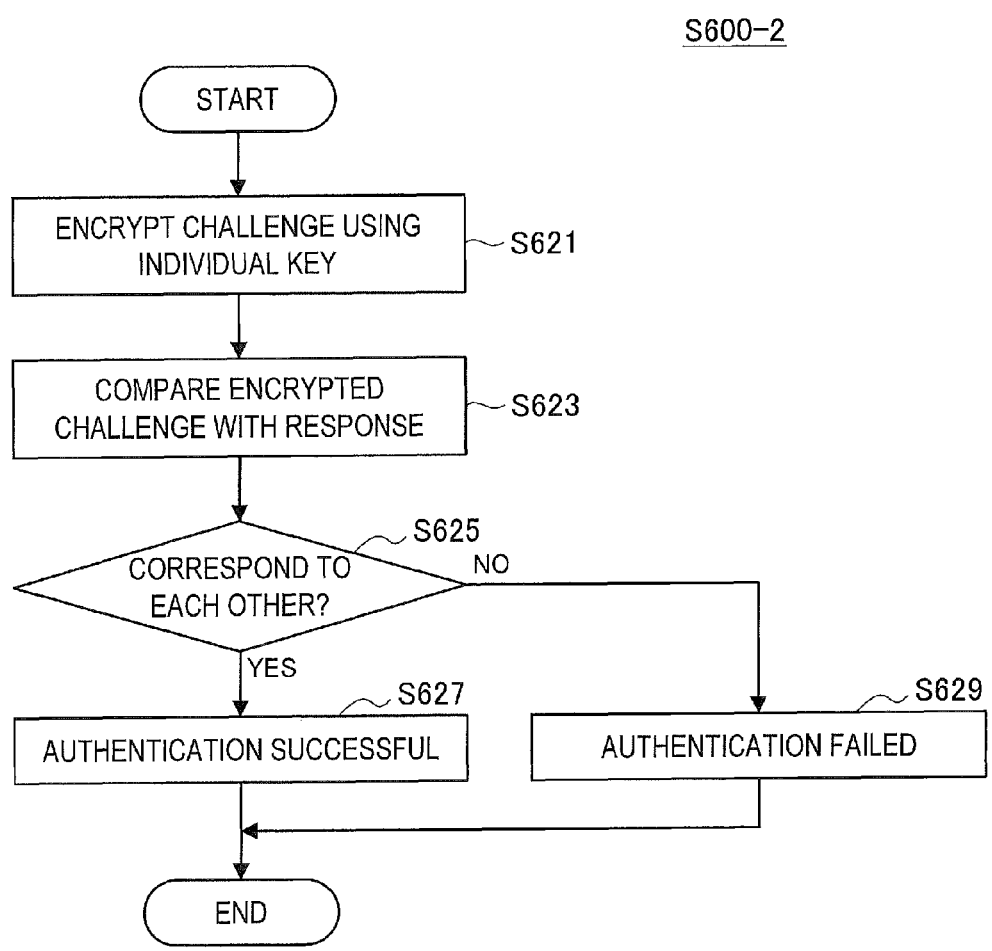
FIG. 17 is a flowchart showing a second example of a schematic flow of comparison processing according to an embodiment.

Next, with reference to FIG. 17, a second example of comparison processing according to the present embodiment will be described. FIG. 17 is a flowchart showing a second example of a schematic flow of comparison processing according to the present embodiment. The comparison processing corresponds to the comparison processing described with reference to FIG. 9.

In Step S621, the CPU 101 of the main device 100 encrypts a challenge using the individual key 21.

In Step S623, the CPU 101 of the main device 100 compares the encrypted challenge with a received response.

In Step S625, if the encrypted challenge and the received response correspond to each other, the processing proceeds to Step S627. If not, the processing proceeds to Step S629.

In Step S627, the CPU 101 of the main device 100 determines that the peripheral device 200 is a genuine product (or authorized product). That is, the authentication of the peripheral device 200 is succeeded. Then, the processing ends.

In Step S629, the CPU 101 of the main device 100 determines that the peripheral device 200 is a fake product. That is, the authentication of the peripheral device 200 is failed. Then, the processing ends.

Heretofore, the configurations of the respective devices and the flows of processing according to the present embodiment have been described. According to the present embodiment, high-speed secure device authentication can be performed at a low cost.

More specifically, first, although the peripheral device 200 includes the tamper-resistant security chip 300, the main device 100 may not include a tamper-resistant security chip. Further, since an asymmetric key (for example, public key or private key) is not used as in the case of the public key cryptography, the main device 100 does not require large memory. Therefore, according to the present embodiment, the cost of the information processing system 1 including the main device 100 and the peripheral device 200 can be reduced.

Second, since an asymmetric key (for example, public key or private key) which accompanies many mathematically difficult processes is not used, the processing speed does not become slow. Therefore, according to the present embodiment, challenge-response authentication to authenticate the peripheral device 200 can be performed at a high speed.

Third, even when the individual key 21 leaks and is stored in a fake peripheral device, the fake peripheral device is not allowed to be used for a main device 100 other than the main device 100 corresponding to the individual key 21. This is because the individual key 21 is individual key information for each main device. That is, as long as the master key 23 does not leak, a fake peripheral device cannot be produced that can be used by an unspecified number of main devices 100. In addition, since the master key 23 is protected inside the tamper-resistant security chip 300, it is highly unlikely that the master key 23 would leak. Therefore, the challenge-response authentication to authenticate the peripheral device 200 can be performed securely.

As described above, according to the present embodiment, it becomes possible to perform high-speed secure challenge-response authentication to authenticate the peripheral device 200 while reducing the cost of the information processing system 1 including the main device 100 and the peripheral device 200.

5. MODIFIED EXAMPLE

Next, with reference to FIGS. 18 to 21, first to third modified examples according to the present embodiment will be described.

<<5.1. First Modified Example>>

First, with reference to FIG. 18 and FIG. 19, a first modified example of the present embodiment will be described.

In the present embodiment described above, the individual key 21 is generated in the peripheral device 200 each time challenge-response authentication is performed. Although the challenge-response authentication is performed by the same main device 100, the individual key 21 is generated each time, which creates excess processes every time.

Accordingly, in the first modified example of the present embodiment, the peripheral device 200 stores the generated individual key 21. In performing the challenge-response authentication, when the individual key 21 to be used for generating a response is already present, the individual key 21 is not generated again and the stored individual key 21 is used.

Hereinafter, the first modified example of the present embodiment will be described more specifically.

(Storage 333)

The individual key 21 generated by the individual key generation part 335 is stored. For example, the storage 333 of the security chip 300 further stores the individual key 21 generated by the individual key generation part 335. More specifically, for example, the storage 333 stores a look-up table including the generated individual key 21 and device specific information 10 corresponding to the individual key 21.

(Individual Key Generation Part 335)

When the individual key generation part 335 of the security chip 300 generates the individual key 21, the individual key generation part 335 stores the individual key 21 in the storage 333.

Further, when the device specific information 10 corresponding to the individual key 21 is acquired after the individual key 21 is stored, the stored individual key 21 is used to generate a response from a challenge. That is, when the device specific information 10 corresponding to the individual key 21 is acquired after the individual key 21 is stored, the individual key generation part 335 does not generate the individual key 21 from the acquired device specific information 10 and acquires the stored individual key 21. Hereinafter, this point will be described more specifically with reference to FIG. 18.

Figure 18:
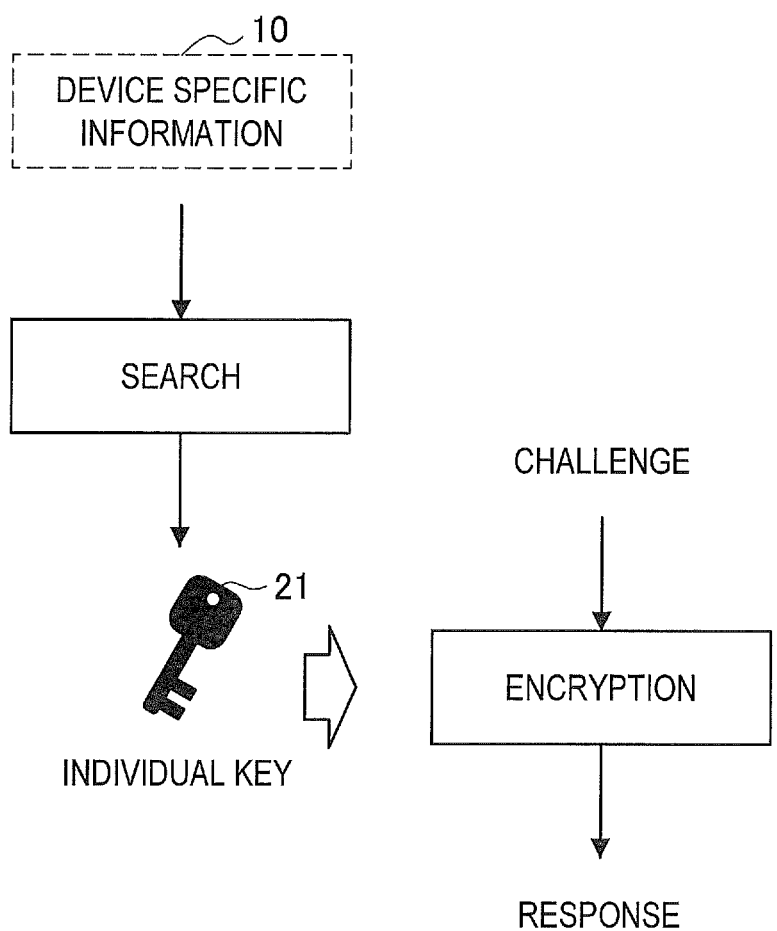
FIG. 18 is an explanatory diagram illustrating a modified example of processing of generating a response using an individual key.
Figure 19:
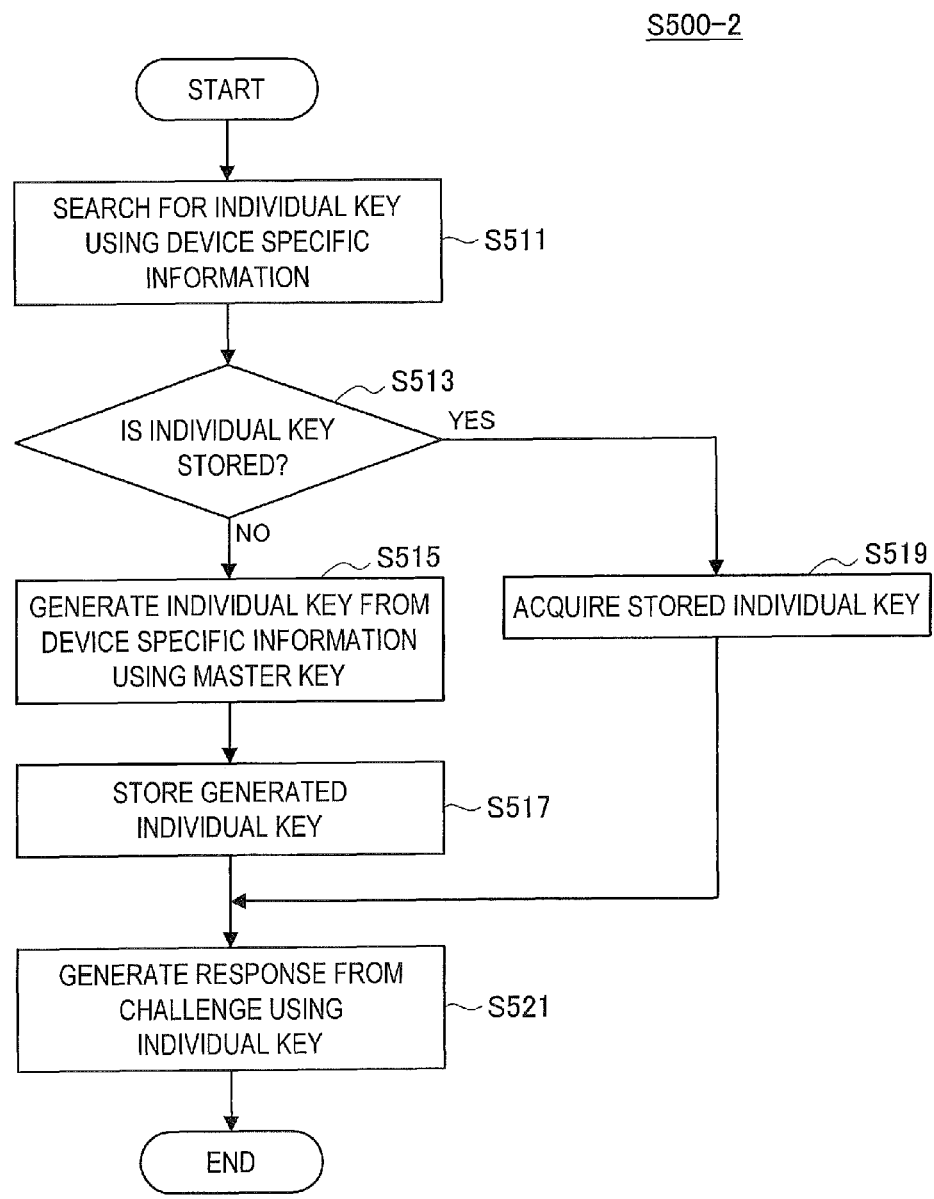
FIG. 19 is a flowchart showing an example of a schematic flow of response-generation processing according to a first modified example of an embodiment.

FIG. 18 is an explanatory diagram illustrating a modified example of processing of generating a response using an individual key 21. Referring to FIG. 18, when the device specific information 10 is acquired, the individual key generation part 335 searches for an individual key 21 stored in the storage 333 using the acquired device specific information 10. Then, in the case where the individual key 21 corresponding to the device specific information 10 is stored, the individual key generation part 335 acquires the stored individual key 21. After that, in the same manner as the present embodiment described above, the response generation part 337 generates a response from a challenge using the individual key 21.

(S500-2: Response-Generation Processing)

Next, with reference to FIG. 19, an example of response-generation processing according to the first modified example of the present embodiment will be described. FIG. 19 is a flowchart showing an example of a schematic flow of response-generation processing according to the first modified example of the present embodiment. The response-generation processing corresponds to the processing described with reference to FIG. 13 and FIG. 18.

In Step S511, the individual key generation part 335 of the security chip 300 searches for an individual key 21 stored in the storage 333 using acquired device specific information 10.

In Step S513, in the case where the individual key corresponding to the device specific information 10 is stored, the processing proceeds to Step S519. If not, the processing proceeds to Step S515.

In Step S515, the individual key generation part 335 of the security chip 300 generates the individual key 21 from the device specific information 10 using the master key 23.

In Step S517, the individual key generation part 335 of the security chip 300 stores the generated individual key 21 in the storage 333.

In Step S519, the individual key generation part 335 of the security chip 300 acquires the stored individual key 21.

In Step S521, the response generation part 337 uses the individual key 21 and generates a response to be transmitted to the main device 100 from a challenge transmitted from the main device 100. Then, the processing ends.

Heretofore, the first modified example of the present embodiment has been described. According to the first modified example of the present embodiment, in the peripheral device 200, at the time of performing the challenge-response authentication, only an individual key 21 that has not been generated is generated. That is, in the second and subsequent challenge-response authentication performed by a certain main device 100, the individual key 21 is not generated in the peripheral device 200. Therefore, the amount of processing performed by the peripheral device 200 in the challenge-response authentication can be reduced. As a result, the time required for the challenge-response authentication is shortened. That is, the processing speed increases.

<<5.2. Second Modified Example>>

Next, referring to FIG. 20, a second modified example of the present embodiment will be described. In the present embodiment described above, the individual key 21 stored in the main device 100 is stored in the main device 100 before shipment from a manufacturing facility. As an operation of storing the individual key 21 in the main device 100 in this manner, assumed is generating the individual key from the device specific information 10 using a PC for generating an individual key, and registering the individual key 21 in the main device 100, at the time of manufacturing in a manufacturing facility or the like. Performing such an operation involves a great amount of time and effort.

Accordingly, in the second modified example of the present embodiment, the peripheral device 200 generates the individual key 21 from the device specific information 10 of the main device 100, and provides the main device 100 with the generated individual key 21.

Hereinafter, the second modified example of the present embodiment will be described more specifically.

(Individual Key Generation Part 335)

The generated individual key 21 is transmitted to the main device 100 in the case where a predetermined condition is satisfied. For example, the individual key generation part 335 of the security chip 300 causes the peripheral device 200 (communication interface 211) to transmit the generated individual key 21 to the main device 100 in the case where the predetermined condition is satisfied.

More specifically, for example, when the device specific information 10 is received by the communication interface 211 from the main device 100, the individual key generation part 335 generates the individual key 21 from the device specific information 10 using the master key 23. After that, the individual key generation part 335 causes the communication interface 211 to transmit the generated individual key 21 to the main device 100.

The predetermined condition may include, for example, that the number of times the individual key 21 is transmitted is less than or equal to a predetermined number of times. More specifically, for example, the individual key generation part 335 determines whether or not the number of times the individual key 21 has already been transmitted is less than or equal to the predetermined number of times. Then, in the case where the number of times the individual key 21 has already been transmitted is less than or equal to the predetermined number of times, the individual key generation part 335 generates the individual key 21 from the device specific information 10 using the master key 23, and causes the communication interface 211 to transmit the generated individual key 21 to the main device 100. Note that the predetermined number of times is one, for example.

(Individual Key-Generation Processing)

Figure 20:
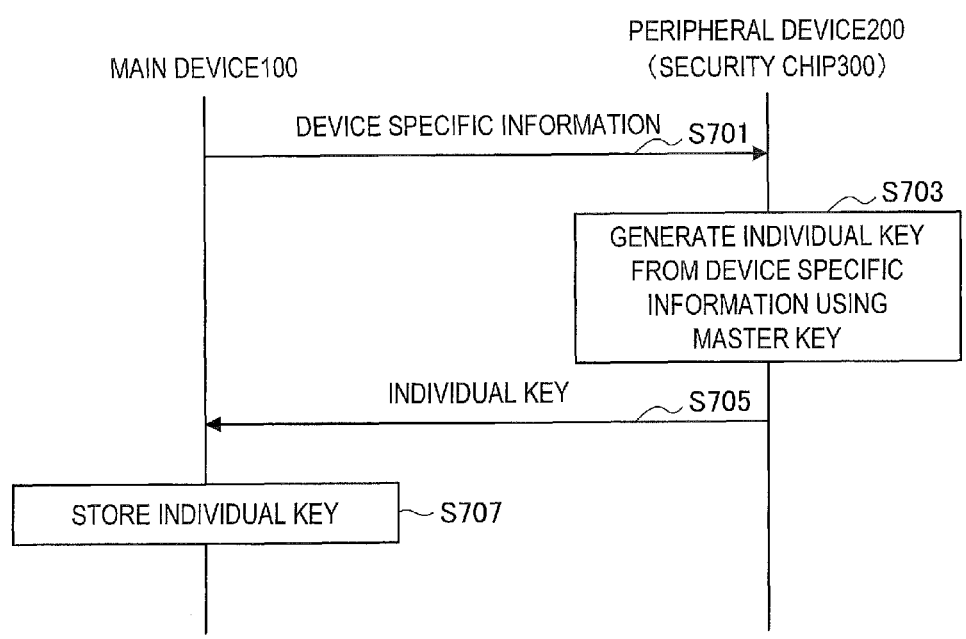
FIG. 20 is a sequence diagram showing an example of a schematic flow of individual key-generation processing according to a second modified example of an embodiment.

With reference to FIG. 20, an example of individual key-generation processing according to the second modified example of the present embodiment will be described. FIG. 20 is a sequence diagram showing an example of a schematic flow of individual key-generation processing according to the second modified example of the present embodiment.

In Step S701, the communication interface 111 of the main device 100 transmits the device specific information 10 to the peripheral device 200.

In Step S703, in the case where the number of times the individual key 21 has already been transmitted is less than or equal to a predetermined number of times, the individual key generation part 335 generates the individual key 21 from the device specific information 10 using the master key 23. Note that, in the case where the number of times the individual key 21 has already been transmitted exceeds the predetermined number of times, the processing ends at this point.

In Step S705, the individual key generation part 335 causes the communication interface 211 to transmit the generated individual key 21 to the main device 100. The communication interface 111 of the main device 100 receives the individual key 21 transmitted by the peripheral device 200.

In Step S707, the main device 100 stores the received individual key 21.

Heretofore, the second modified example of the present embodiment has been described. According to the second modified example of the present embodiment, the following operation becomes unnecessary at the time of manufacturing in a manufacturing facility or the like: generating the individual key 21 using a PC for generating an individual key, and registering the individual key 21 in the main device 100. Accordingly, the burden imposed on the operation of causing the main device 100 to store the individual key 21 is reduced.

Further, the number of times the individual key 21 is transmitted is limited to the predetermined number of times, and hence, the individual key 21 is not transmitted to another device more than is necessary. As a result, the risk that individual keys 21 of many main devices 100 may leak can be reduced.

<<5.3. Third Modified Example>>

Next, with reference to FIG. 21, a third modified example of the present embodiment will be described. In the third modified example of the present embodiment, communication between the main device 100 and the peripheral device 200 related to challenge-response authentication is performed using near field communication (NFC).

(Communication Interface 111)

The communication interface 111 of the main device 100 includes an NFC communication interface for the main device 100 to communicate with an external device (in particular, peripheral device 200) using NFC. The communication interface 111 communicates in accordance with a communication standard of NFC. As an example, the communication standard is a communication standard of FeliCa (registered trademark) or NFC-F.

In particular, the transmission of a challenge and device specific information 10 is performed using NFC. That is, the communication interface 111 transmits the challenge and the device specific information 10 for challenge-response authentication to the peripheral device 200 using NFC.

For example, the transmission of the challenge and the device specific information 10 is performed using a command for writing compliant with the communication standard of NFC. As an example, the command for writing is a "Write Without Encryption" command, which is a FeliCa command. In this case, the communication interface 111 transmits the "Write Without Encryption" command including the challenge and the device specific information 10 to the peripheral device 200.

Note that the transmission of the challenge and the device specific information 10 may be performed using a command for reading compliant with the communication standard of NFC. As an example, the command for reading is a "Read Without Encryption" command, which is a FeliCa command. In this case, the communication interface 111 transmits the "Read Without Encryption" command including the challenge and the device specific information 10 to the peripheral device 200.

Further, reception of a response is also performed using NFC. That is, the communication interface 111 receives the response for challenge-response authentication from the peripheral device 200 using NFC.

(Communication Interface 211)

The communication interface 211 of the peripheral device 200 includes an NFC communication interface for the peripheral device 200 to communicate with an external device (in particular, main device 100) using NFC. The communication interface 211 communicates in accordance with a communication standard of NFC. As an example, the communication standard is a communication standard of FeliCa (registered trademark) or NFC-F.

In particular, the transmission of a response is performed using NFC. That is, the communication interface 211 transmits the response for challenge-response authentication to the main device 100 using NFC.

For example, the transmission of the response is performed using a command for reading compliant with the communication standard of NFC. As an example, the command for reading is a "Read Without Encryption" command, which is a FeliCa command. In this case, the communication interface 211 transmits a "Read Without Encryption" response including the response to the main device 100.

Further, the transmission of the response may be performed using a command for writing compliant with the communication standard of NFC. As an example, the command for writing is a "Write Without Encryption" command, which is a FeliCa command. In this case, the communication interface 211 transmits a "Write Without Encryption" response including the response to the main device 100.

(Challenge-Response Authentication Processing)

Figure 21:
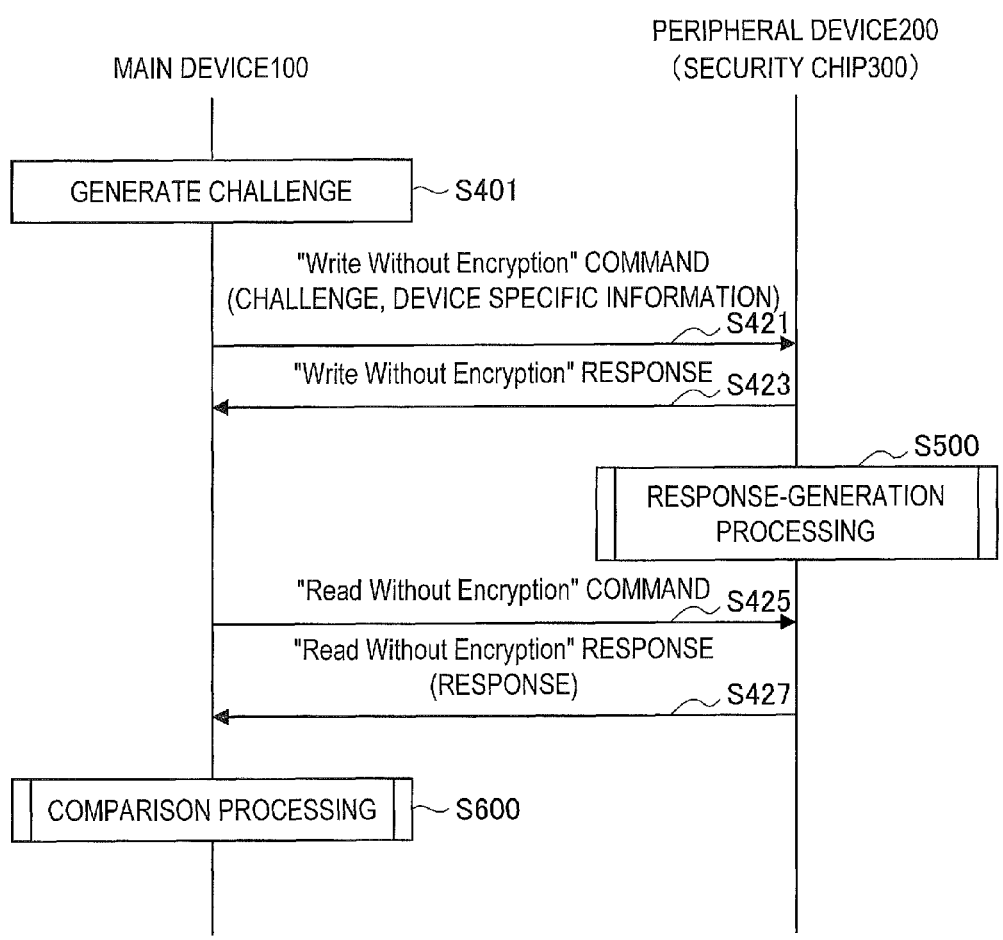
FIG. 21 is a sequence diagram showing an example of a schematic flow of challenge-response authentication processing according to a third modified example of an embodiment.

With reference to FIG. 21, an example of challenge-response authentication processing according to the third modified example of the present embodiment will be described. FIG. 21 is a sequence diagram showing an example of a schematic flow of challenge-response authentication processing according to the third modified example of the present embodiment.

In Step S401, the CPU 101 of the main device 100 generates a challenge for challenge-response authentication.

In Step S421, the communication interface 111 of the main device 100 transmits a "Write Without Encryption" command including the challenge and device specific information 10 to the peripheral device 200. Then, in Step S423, the communication interface 211 of the peripheral device 200 transmits a "Write Without Encryption" response to the main device 100.

In Step S500, the security chip 300 included in the peripheral device 200 executes the response-generation processing. That is, the security chip 300 generates a response corresponding to the challenge.

In Step S425, the communication interface 111 of the main device 100 transmits a "Read Without Encryption" command to the peripheral device 200. Then, in Step S427, the communication interface 211 transmits a "Read Without Encryption" response including the response to the main device 100.

In Step S600, the CPU 101 of the main device 100 executes comparison processing using the challenge and the response. As a result, an authentication result can be obtained showing whether the peripheral device 200 is a genuine product (or authorized product) or a fake product.

Heretofore, the third modified example of the present embodiment has been described. According to the third modified example of the present embodiment, since the transmission and the reception for the challenge-response authentication are performed using NFC, authentication is performed at the time point of bringing the peripheral device 200 close. Accordingly, the authentication is completed before the peripheral device 200 is used. Therefore, according to the third modified example of the present embodiment, it becomes possible to save or shorten the waiting time due to the authentication.

Further, by using the command for writing compliant with the communication standard of NFC or the writing command, it becomes possible to perform the challenge-response authentication without adding a new command.

6. CONCLUSION

Heretofore, with reference to FIGS. 1 to 21, the configurations of the respective devices, the processing flows, and the modified examples according to an embodiment of the present disclosure have been described. According to an embodiment of the present disclosure, the security chip 300 acquires the device specific information 10 transmitted by the main device 100. Further, the security chip 300 stores the master key 23 that enables generation of the individual key 21 from device specific information, the individual key 21 being used by the main device 100 for challenge-response authentication. Then, the security chip 300 uses the master key 23 and generates the individual key 21 from the device specific information 10. After that, the individual key 21 is used and a response to be transmitted to the main device 100 is generated from a challenge transmitted from the main device 100. Note that, in the main device 100, the individual key 21 is not stored in a tamper-resistant security chip.

In this way, it becomes possible to perform high-speed secure device authentication at a low cost.

More specifically, first, although the peripheral device 200 includes the tamper-resistant security chip 300, the main device 100 may not include a tamper-resistant security chip. Further, since an asymmetric key (for example, public key or private key) is not used as in the case of the public key cryptography, the main device 100 does not require large memory. Therefore, according to the present embodiment, the cost of the information processing system 1 including the main device 100 and the peripheral device 200 can be reduced.

Second, since an asymmetric key (for example, public key or private key) which accompanies many mathematically difficult processes is not used, the processing speed does not become slow. Therefore, according to the present embodiment, challenge-response authentication to authenticate the peripheral device 200 can be performed at a high speed.

Third, even when the individual key 21 leaks and is stored in a fake peripheral device, the fake peripheral device is not allowed to be used for a main device 100 other than the main device 100 corresponding to the individual key 21. This is because the individual key 21 is individual key information for each main device 100. That is, as long as the master key 23 does not leak, a fake peripheral device cannot be produced that can be used by an unspecified number of main devices 100. In addition, since the master key 23 is protected inside the tamper-resistant security chip 300, it is highly unlikely that the master key 23 would leak. Therefore, the challenge-response authentication to authenticate the peripheral device 200 can be performed securely.

As described above, according to the present embodiment, it becomes possible to perform high-speed secure challenge-response authentication to authenticate the peripheral device 200 while reducing the cost of the information processing system 1 including the main device 100 and the peripheral device 200.

Further, for example, the master key 23 is key information shared with another security chip that operates in the same manner as the security chip 300.

Accordingly, the main device 100 can continuously use the individual key 21 (that is stored before shipment from a manufacturing facility, for example) even if the peripheral device 200 is exchanged for another one. In addition, even when the peripheral device 200 is connected to or built into another main device 100, the other main device 100 can authenticate the peripheral device 200.

Further, for example, the device specific information 10 is information that is randomly generated (for example, random numbers) for the main device 100.

Accordingly, information specific to the main device 100 can be obtained even in the case where it is difficult to acquire identification information of the main device 100.

Further, the device specific information 10 may also be identification information for uniquely identifying the main device 100 or a component of the main device 100.

Accordingly, information specific to the main device 100 can be obtained without generating new information.

Further, for example, the challenge-response authentication includes comparing a response generated by the peripheral device 200 (security chip 300) with a response generated from a challenge by the main device 100 using the individual key 21.

Accordingly, the processing can be accelerated not by performing the comparison between challenges but by performing the comparison between responses. First, the main device 100 can generate a response from a challenge from the time of transmitting the challenge to the peripheral device 200 until the time of receiving the response from the peripheral device 200. Accordingly, the main device 100 can perform the comparison immediately after the reception of the response. As a result, the time required for the processing is shortened. Second, since the time required for the processing of encrypting the challenge is shorter than the time required for the processing of decrypting the response, the time required for the processing is shortened. In this way, the processing may be accelerated.

Further, according to the first modified example of an embodiment of the present disclosure, the individual key 21 generated by the individual key generation part 335 is stored. Then, when the device specific information 10 corresponding to the individual key 21 is acquired after the individual key 21 is stored, the stored individual key 21 is used to generate a response from a challenge.

Accordingly, in the peripheral device 200, at the time of performing the challenge-response authentication, only an individual key 21 that has not been generated is generated. That is, in the second and subsequent challenge-response authentication performed by a certain main device 100, the individual key 21 is not generated in the peripheral device 200. Therefore, the amount of processing performed by the peripheral device 200 in the challenge-response authentication can be reduced. As a result, the time required for the challenge-response authentication is shortened. That is, the processing speed increases.

Further, according to the second modified example of an embodiment of the present disclosure, the generated individual key 21 is transmitted to the main device 100 in the case where a predetermined condition is satisfied.

Accordingly, the following operation becomes unnecessary at the time of manufacturing in a manufacturing facility or the like: generating the individual key 21 using a PC for generating an individual key, and registering the individual key 21 in the main device 100. Accordingly, the burden imposed on the operation of causing the main device 100 to store the individual key 21 is reduced.

Further, for example, the predetermined condition may include, for example, that the number of times the individual key 21 is transmitted is less than or equal to a predetermined number of times.

Accordingly, the number of times the individual key 21 is transmitted is limited to the predetermined number of times, and hence, the individual key 21 is not transmitted to another device more than is necessary. As a result, the risk that individual keys 21 of many main devices 100 may leak can be reduced.

Further, according to the third modified example of an embodiment of the present disclosure, transmission of a challenge and device specific information 10 is performed using NFC.

Accordingly, authentication is performed at the time point of bringing the peripheral device 200 close. Accordingly, the authentication is completed before the peripheral device 200 is used. Therefore, according to the third modified example of the present embodiment, it becomes possible to save or shorten the waiting time due to the authentication.

Further, for example, the transmission of a challenge and device specific information 10 or the transmission of a response is performed using NFC.

Accordingly, it becomes possible to perform the challenge-response authentication without adding a new command.

It should be understood by those skilled in the art that various modifications, combinations, sub-combinations and alterations may occur depending on design requirements and other factors insofar as they are within the scope of the appended claims or the equivalents thereof.

For example, although a main device has been described as an example of the information processing apparatus that authenticates another device (for example, peripheral device), the information processing apparatus is not limited to the main device. The information processing apparatus may be any of devices (including not only a finished product, but also a component such as a chip) that are required to authenticate another device.

Further, although a peripheral device has been described as an example of the information processing apparatus that is authenticated by another device (for example, main device), the information processing apparatus is not limited to the peripheral device. The information processing apparatus is any of devices that are to be prevented from being forged, and may be any of the devices (including not only a finished product, but also a component such as a chip) each including a security chip.

Further, although an example has been described in which generation of a response using an individual key is performed by a security chip, the present disclosure is not limited to the example. For example, a processing circuit (for example, CPU of a peripheral device) outside a security chip may generate a response from a challenge using an individual key generated by a security chip.

Further, although an example has been described in which a master key is shared between security chips of genuine products (or authorized products), the present disclosures is not limited to the example. For example, the master key may be shared on the basis of types of peripheral devices (for example, battery pack and controller). In this case, a security chip is prepared, which stores a corresponding master key for each type of peripheral device. Further, for example, several master keys may also be used for the same type of peripheral device. For example, the master key may be shared on the basis of a manufacturer of the peripheral device. In this case, a security chip is prepared, which stores a corresponding master key for each manufacturer (and for each type of peripheral device). Note that, in the case where multiple master keys are present, the main device stores individual keys corresponding to the respective multiple master keys.

Further, hardware configurations of the main device, the peripheral device, and the security chip are not limited to the examples described above. Various hardware configurations may be employed for implementing functions of the main device, the peripheral device, and the security chip. As an example, a wired logic may be provided instead of a CPU.

Further, the respective processing steps included in the information processing of the present specification are not necessarily processed in a time-series order in accordance with the flowcharts. For example, the respective processing steps included in the information processing may be processed in different order from the flowcharts, or may be processed in a parallel manner.

Further, it is also possible to create a computer program for causing hardware such as a CPU, ROM, and RAM, which are built in an information processing apparatus, to exhibit substantially the same functions as those of respective structures of the information processing apparatus described above. Further, there is also provided a storage medium having the computer program stored therein.

Additionally, the present technology may also be configured as below.

(1) A security chip having a tamper-resistant feature, including:

an acquisition part configured to acquire specific information transmitted by a device performing challenge-response authentication, the specific information being specific to the device;

a storage configured to store second key information that enables generation of first key information from the specific information, the first key information being used by the device for challenge-response authentication; and a generation part configured to generate, using the second key information, the first key information from the specific information, wherein a response to be transmitted to the device is generated, using the first key information, from a challenge transmitted by the device, and wherein, in the device, the first key information is not stored in a tamper-resistant security chip.

(2) The security chip according to (1), wherein the second key information is key information shared with another security chip that operates in a same manner as the security chip.

(3) The security chip according to (1) or (2), wherein the specific information is information that is randomly generated for the device.

(4) The security chip according to (1) or (2), wherein the specific information is identification information for uniquely identifying the device or a component of the device.

(5) The security chip according to any one of (1) to (4), wherein the generated first key information is stored, and wherein, after the first key information is stored, when the specific information is acquired, the response is generated from the challenge by using the stored first key information.

(6) The security chip according to any one of (1) to (5), wherein, in a case where a predetermined condition is satisfied, the generated first key information is transmitted to the device.

(7) The security chip according to (6), wherein the predetermined condition includes that a number of times the first key information is transmitted does not exceed a predetermined number of times.

(8) The security chip according to any one of (1) to (7), wherein the challenge-response authentication includes comparing the response generated by the security chip with a response generated by the device from the challenge by using the first key information.

(9) The security chip according to any one of (1) to (8), wherein transmission of the challenge and the specific information, or transmission of the response is performed using near field communication (NFC).

(10) The security chip according to (9), wherein the transmission of the challenge and the specific information, or the transmission of the response is performed using a command for writing or a command for reading compliant with a communication standard of the near field communication (NFC).

(11) A program for causing a security chip having a tamper-resistant feature to function as an acquisition part configured to acquire specific information transmitted by a device performing challenge-response authentication, the specific information being specific to the device, and a generation part configured to generate first key information from the specific information using second key information stored in the security chip, the second key information enabling generation of the first key information from the specific information, the first key information being used by the device for challenge-response authentication, wherein a response to be transmitted to the device is generated, using the first key information, from a challenge transmitted by the device, and wherein, in the device, the first key information is not stored in a tamper-resistant security chip.

(12) An information processing apparatus including:

a communication interface configured to receive a challenge transmitted by a device performing challenge-response authentication and specific information transmitted by the device, the specific information being specific to the device, and to transmit a response corresponding to the challenge to the device; and a security chip having a tamper-resistant feature, wherein the security chip includes an acquisition part configured to acquire the specific information, a storage configured to store second key information that enables generation of first key information from the specific information, the first key information being used by the device for challenge-response authentication, and a generation part configured to generate, using the second key information, the first key information from the specific information, wherein a response to be transmitted to the device is generated from the challenge by using the first key information, and wherein, in the device, the first key information is not stored in a tamper-resistant security chip.

(13) An information processing apparatus including:

a communication interface configured to transmit a challenge and specific information specific to the information processing apparatus, the challenge and the specific information being used for challenge-response authentication, to a device including a security chip having a tamper-resistant feature, and to receive a response corresponding to the challenge from the device; and a processing circuit configured to perform challenge-response authentication by using first key information stored in the information processing apparatus, the challenge, and the response, wherein the security chip stores second key information that enables generation of the first key information from the specific information, wherein the first key information is generated by the security chip using the second key information from the specific information, wherein, in the device, the response is generated from the challenge by using the first key information, and wherein, in the information processing apparatus, the first key information is not stored in a tamper-resistant security chip.

(14) An information processing system including:
a first information processing apparatus; and
a second information processing apparatus,
wherein the first information processing apparatus includes
 a communication interface configured to transmit a challenge and specific information specific to the first information processing apparatus, the challenge and the specific information being used for challenge-response authentication, to the second information processing apparatus, and to receive a response corresponding to the challenge from the second information processing apparatus, and
 a processing circuit configured to perform challenge-response authentication by using first key information stored in the first information processing apparatus, the challenge, and the response,
wherein the second information processing apparatus includes
 a communication interface configured to receive the challenge and the specific information, the challenge and the specific information being transmitted by the first information processing apparatus, and to transmit the response to the first information processing apparatus, and
 a security chip having a tamper-resistant feature,
 wherein the security chip includes
  an acquisition part configured to acquire the specific information,
  a storage configured to store second key information that enables generation of the first key information from the specific information, and
  a generation part configured to generate, using the second key information, the first key information from the specific information,
wherein, in the second information processing apparatus, the response is generated from the challenge by using the first key information, and
wherein, in the first information processing apparatus, the first key information is not stored in a tamper-resistant security chip.

The present disclosure contains subject matter related to that disclosed in Japanese Priority Patent Application JP 2012-195126 filed in the Japan Patent Office on Sep. 5, 2012, the entire content of which is hereby incorporated by reference.

What is claimed is:

1. A security chip having a tamper-resistant feature, comprising:
an acquisition part configured to acquire specific information transmitted by a device performing challenge-response authentication, the specific information being specific to the device;
a storage configured to store second key information that enables generation of first key information from the specific information, the first key information being used by the device for challenge-response authentication; and
a generation part configured to generate, using the second key information, the first key information from the specific information,
wherein a response to be transmitted to the device is generated, using the first key information, from a challenge transmitted by the device, and
wherein, in the device, the first key information is not stored in a tamper-resistant security chip.

2. The security chip according to claim 1,
wherein the second key information is key information shared with another security chip that operates in a same manner as the security chip.

3. The security chip according to claim 1,
wherein the specific information is information that is randomly generated for the device.

4. The security chip according to claim 1,
wherein the specific information is identification information for uniquely identifying the device or a component of the device.

5. The security chip according to claim 1,
wherein the generated first key information is stored, and
wherein, after the first key information is stored, when the specific information is acquired, the response is generated from the challenge by using the stored first key information.

6. The security chip according to claim 1,
wherein, in a case where a predetermined condition is satisfied, the generated first key information is transmitted to the device.

7. The security chip according to claim 6,
wherein the predetermined condition includes that a number of times the first key information is transmitted does not exceed a predetermined number of times.

8. The security chip according to claim 1,
wherein the challenge-response authentication includes comparing the response generated by the security chip with a response generated by the device from the challenge by using the first key information.

9. The security chip according to claim 1,
wherein transmission of the challenge and the specific information, or transmission of the response is performed using near field communication (NFC).

10. The security chip according to claim 9,
wherein the transmission of the challenge and the specific information, or the transmission of the response is performed using a command for writing or a command for reading compliant with a communication standard of the near field communication (NFC).

11. A non-transitory computer readable storage medium having stored thereon a program for causing a security chip having a tamper-resistant feature to function as
an acquisition part configured to acquire specific information transmitted by a device performing challenge-response authentication, the specific information being specific to the device, and
a generation part configured to generate first key information from the specific information using second key information stored in the security chip, the second key information enabling generation of the first key information from the specific information, the first key information being used by the device for challenge-response authentication,
wherein a response to be transmitted to the device is generated, using the first key information, from a challenge transmitted by the device, and
wherein, in the device, the first key information is not stored in a tamper-resistant security chip.

12. An information processing apparatus comprising:
a communication interface configured to receive a challenge transmitted by a device performing challenge-response authentication and specific information transmitted by the device, the specific information being specific to the device, and to transmit a response corresponding to the challenge to the device; and
a security chip having a tamper-resistant feature,
wherein the security chip includes
- an acquisition part configured to acquire the specific information,
- a storage configured to store second key information that enables generation of first key information from the specific information, the first key information being used by the device for challenge-response authentication, and
- a generation part configured to generate, using the second key information, the first key information from the specific information, wherein a response to be transmitted to the device is generated from the challenge by using the first key information, and wherein, in the device, the first key information is not stored in a tamper-resistant security chip.

13. An information processing apparatus comprising:
a communication interface configured to transmit a challenge and specific information specific to the information processing apparatus, the challenge and the specific information being used for challenge-response authentication, to a device including a security chip having a tamper-resistant feature, and to receive a response corresponding to the challenge from the device; and
a processing circuit configured to perform challenge-response authentication by using first key information stored in the information processing apparatus, the challenge, and the response,
wherein the security chip stores second key information that enables generation of the first key information from the specific information,
wherein the first key information is generated by the security chip using the second key information from the specific information,
wherein, in the device, the response is generated from the challenge by using the first key information, and
wherein, in the information processing apparatus, the first key information is not stored in a tamper-resistant security chip.

14. An information processing system comprising:
a first information processing apparatus; and
a second information processing apparatus,
wherein the first information processing apparatus includes
- a communication interface configured to transmit a challenge and specific information specific to the first information processing apparatus, the challenge and the specific information being used for challenge-response authentication, to the second information processing apparatus, and to receive a response corresponding to the challenge from the second information processing apparatus, and
- a processing circuit configured to perform challenge-response authentication by using first key information stored in the first information processing apparatus, the challenge, and the response, wherein the second information processing apparatus includes
- a communication interface configured to receive the challenge and the specific information, the challenge and the specific information being transmitted by the first information processing apparatus, and to transmit the response to the first information processing apparatus, and
- a security chip having a tamper-resistant feature,
  wherein the security chip includes
  - an acquisition part configured to acquire the specific information,
  - a storage configured to store second key information that enables generation of the first key information from the specific information, and
  - a generation part configured to generate, using the second key information, the first key information from the specific information, wherein, in the second information processing apparatus, the response is generated from the challenge by using the first key information, and wherein, in the first information processing apparatus, the first key information is not stored in a tamper-resistant security chip.

15. A security chip having a tamper-resistant feature, comprising:
circuitry configured to perform as (i) an acquisition part to acquire specific information transmitted by a device performing challenge-response authentication, the specific information being specific to the device, (ii) a storage to store second key information that enables generation of first key information from the specific information, the first key information being used by the device for challenge-response authentication, and (iii) a generation part to generate, using the second key information, the first key information from the specific information, wherein a response to be transmitted to the device is generated, using the first key information, from a challenge transmitted by the device, and wherein, in the device, the first key information is not stored in a tamper-resistant security chip.

* * * * *